United States Patent
Agarwal

(10) Patent No.: US 12,541,891 B2
(45) Date of Patent: Feb. 3, 2026

(54) GENERATING CHAIN PULL PAINTING STYLES IN DIGITAL APPLICATIONS

(71) Applicant: Adobe Inc., San Jose, CA (US)

(72) Inventor: Tanu Agarwal, Noida (IN)

(73) Assignee: Adobe Inc., San Jose, CA (US)

( * ) Notice: Subject to any disclaimer, the term of this patent is extended or adjusted under 35 U.S.C. 154(b) by 88 days.

(21) Appl. No.: 17/808,489

(22) Filed: Jun. 23, 2022

(65) Prior Publication Data
US 2023/0419567 A1    Dec. 28, 2023

(51) Int. Cl.
*G06T 11/20* (2006.01)
*G06T 11/60* (2006.01)

(52) U.S. Cl.
CPC ............ *G06T 11/203* (2013.01); *G06T 11/60* (2013.01)

(58) Field of Classification Search
CPC ................................ G06T 11/203; G06T 11/60
See application file for complete search history.

(56) References Cited

U.S. PATENT DOCUMENTS

| | | | | |
|---|---|---|---|---|
| 5,426,726 A * | 6/1995 | Horiuchi | ............... | G06T 11/203 345/475 |
| 6,067,094 A * | 5/2000 | Schuster | ............... | G06T 11/001 345/600 |
| 6,111,588 A * | 8/2000 | Newell | ................... | G06T 11/20 345/441 |
| 6,208,355 B1 * | 3/2001 | Schuster | ................. | G06T 11/20 345/442 |
| 6,333,749 B1 * | 12/2001 | Reinhardt | ................. | G06T 7/75 345/619 |
| 6,348,924 B1 * | 2/2002 | Brinsmead | ............ | G06T 11/001 345/473 |
| 6,911,980 B1 * | 6/2005 | Newell | .................... | G06T 17/30 345/647 |
| 7,385,612 B1 * | 6/2008 | Peterson | ................... | G06T 3/18 345/581 |
| 8,044,955 B1 * | 10/2011 | Yhann | ..................... | G06T 17/20 345/419 |
| 8,610,744 B2 * | 12/2013 | Harris | ................. | G06F 3/04883 345/173 |
| 8,676,552 B2 * | 3/2014 | Mech | ...................... | G06T 13/80 703/2 |

(Continued)

OTHER PUBLICATIONS

"Pull Chain Pour Painting", Oct. 2019, pp. 1-16 (https://www.purplehuesandme.com/2019/10/pull-chain-pour-panting.html).*

(Continued)

*Primary Examiner* — Sarah Lhymn
(74) *Attorney, Agent, or Firm* — Keller Preece PLLC

(57) ABSTRACT

Methods, systems, and non-transitory computer readable storage media are disclosed for generating digital chain pull paintings in digital images. The disclosed system digitally animates a chain pull painting from a digital drawing path by determining a plurality of digital bead points along the digital drawing path. In response to a movement of one of the digital bead points from a first position to a second position (e.g., based on a pull input performed at a selected digital bead point), the disclosed system determines updated positions of one or more digital bead points along the path. The disclosed system also generates one or more strokes in the digital image from previous positions of the digital bead points to the updated positions of the digital bead points.

20 Claims, 13 Drawing Sheets

(56) References Cited

U.S. PATENT DOCUMENTS

| | | | | |
|---|---|---|---|---|
| 8,994,736 B2* | 3/2015 | Carr | ............... | G06F 3/002 |
| | | | | 345/646 |
| 10,216,389 B2* | 2/2019 | Jaramillo | ............... | G06T 11/203 |
| 10,269,150 B1* | 4/2019 | Stringham | ............... | G06T 11/206 |
| 10,410,317 B1* | 9/2019 | Phogat | ............... | G06T 3/18 |
| 10,891,760 B2* | 1/2021 | Kim | ............... | G06T 11/60 |
| 11,010,943 B1* | 5/2021 | Bajic | ............... | G06T 7/136 |
| 2005/0001854 A1* | 1/2005 | Schuster | ............... | G06T 11/001 |
| | | | | 345/639 |
| 2013/0076619 A1* | 3/2013 | Carr | ............... | G06T 19/20 |
| | | | | 345/156 |
| 2013/0120357 A1* | 5/2013 | Joshi | ............... | G06T 19/20 |
| | | | | 345/419 |
| 2013/0120426 A1* | 5/2013 | DiVerdi | ............... | G06T 11/001 |
| | | | | 345/589 |
| 2013/0125068 A1* | 5/2013 | Harris | ............... | G06F 3/03545 |
| | | | | 345/173 |
| 2013/0335333 A1* | 12/2013 | Kukulski | ............... | G06F 3/04847 |
| | | | | 715/702 |
| 2016/0078649 A1* | 3/2016 | Bonacina | ............... | G06V 30/32 |
| | | | | 345/442 |
| 2017/0294032 A1* | 10/2017 | Mantuano | ............... | G06T 11/001 |
| 2018/0260984 A1* | 9/2018 | Severenuk | ............... | G06F 3/016 |

OTHER PUBLICATIONS

"Illustrator CC 2019 new feature—Freeform Gradient" (Oct. 16, 2018) (https://www.youtube.com/watch?v=fhB5tTTLqDU).*

CC, Adobe Illustrator. "Adobe illustrator cc." (2013).*

* cited by examiner

GENERATING CHAIN PULL PAINTING STYLES IN DIGITAL APPLICATIONS

BACKGROUND

Recent years have seen significant advancements in digital image editing and generation. Many industries utilize digital images and digital image processing in digital visual media for use in a variety of different applications, such as graphic design, digital moves, digital advertising, and digital movies. For example, some industries provide tools for users to perform computer-assisted generation of digital images to imitate real-world artistic styles. The proliferation of computer-assisted digital image editing has improved the accuracy and efficiency representing these real-world artistic styles in digital visual media can be a challenging task. Conventional image generation systems are limited in the types of artistic styles that they are able to imitate and the accuracy with which they replicate the artistic styles in digital visual media.

SUMMARY

This disclosure describes one or more embodiments of methods, non-transitory computer readable media, and systems that solve the foregoing problems (in addition to providing other benefits) by generating digital chain pull paintings in digital images. The disclosed systems digitally animate a chain pull painting from a digital drawing path by determining a plurality of digital bead points along the digital drawing path. In response to a movement of one of the digital bead points from a first position to a second position (e.g., based on a pull input performed at a selected digital bead point), the disclosed systems determine updated positions of one or more digital bead points along the path. The disclosed systems also generate one or more strokes in the digital image from previous positions of the digital bead points to the updated positions of the digital bead points. The disclosed systems thus provide efficient and accurate chain pull paintings within digital images.

BRIEF DESCRIPTION OF THE DRAWINGS

Various embodiments will be described and explained with additional specificity and detail through the use of the accompanying drawings in which.

DETAILED DESCRIPTION

Figure 1:
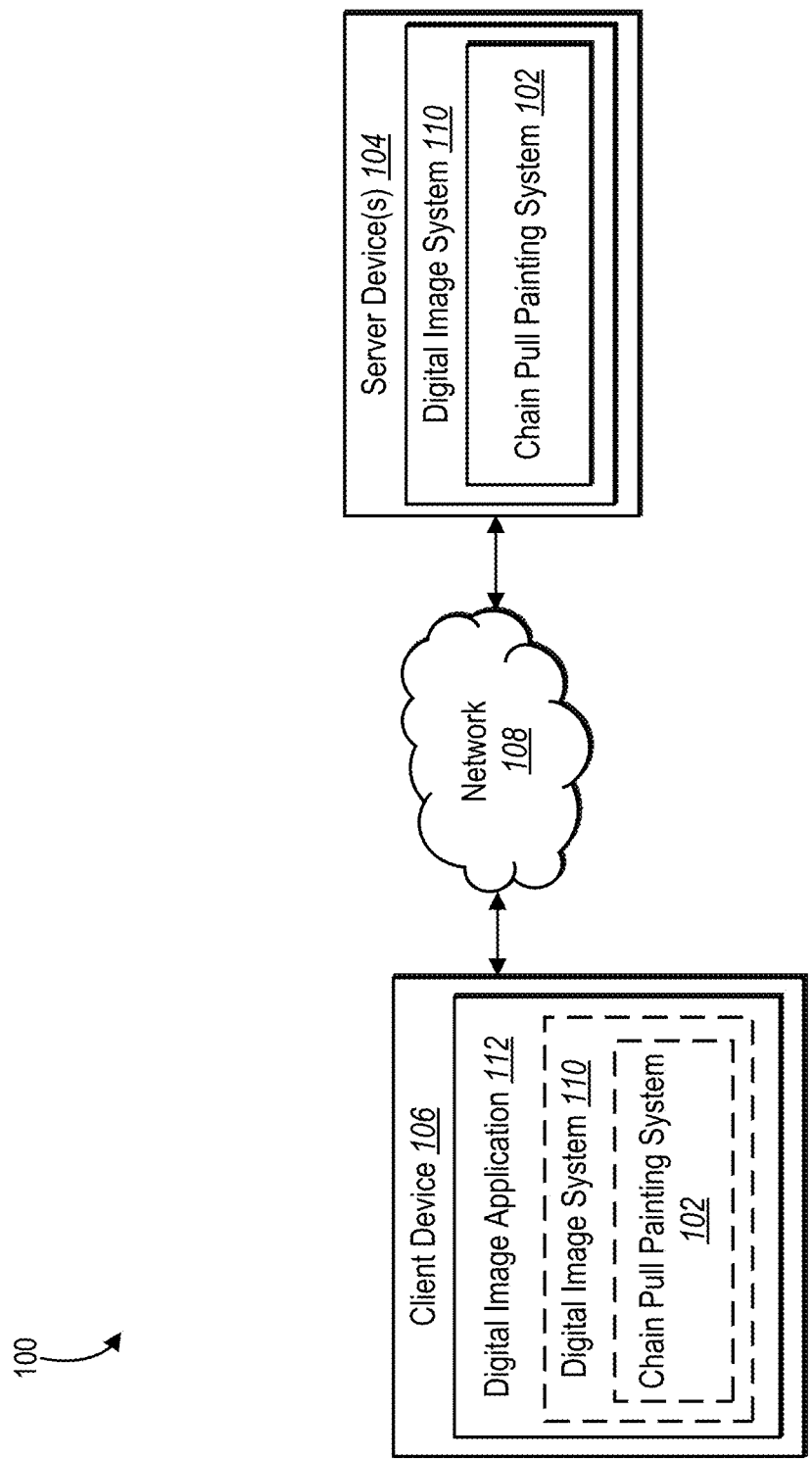
FIG. 1 illustrates an example system environment in which a chain pull painting system can operate in accordance with one or more implementations.

This disclosure describes one or more embodiments of a chain pull painting system that generates digital chain pull paintings in digital images. In one or more embodiments, the chain pull painting system generates a digital beaded chain from a digital drawing path within a digital image. In particular, the chain pull painting system determines a plurality of digital bead points along a digital drawing path in response to a request to generate a digital chain pull painting. In response to an input to move a digital bead point in the digital drawing path, the chain pull painting system determines updated positions for one or more digital bead points according to the movement. The chain pull painting system also generates strokes from previous positions of the one or more digital bead points to the updated positions of the one or more other digital bead points to generate the digital chain pull painting. In additional or alternative embodiments, the chain pull painting system also animates the generation of the strokes to present an animation of the chain pull painting.

As previously mentioned, in one or more embodiments, the chain pull painting system determines digital bead points along a digital drawing path. For example, the chain pull painting system determines an initial path vector captured for the digital drawing path during input of the digital drawing path. Additionally, the chain pull painting system generates a new path vector based on the initial path vector by adding or removing digital bead point paths according to a predetermined digital bead point distance, thus resulting in a plurality of equidistant digital bead points in the new path vector.

In one or more embodiments, the chain pull painting system detects a movement of a selected digital bead point in connection with generating a chain pull painting. For instance, the chain pull painting system detects an input to move a particular digital bead point of the plurality of digital bead points from a first position to a second position. To illustrate, the chain pull painting system detects movement of an initial digital bead point (e.g., at an end of the digital drawing path). Alternatively, the chain pull painting system detects movement of a digital bead point between adjacent digital bead points of the new path vector.

According to one or more embodiments, the chain pull painting system determines updated positions of digital bead points along the digital drawing path based on movement of a selected digital bead point. Specifically, the chain pull painting system determines whether movement of the selected digital bead point meets several conditions related to a distance between a given digital bead point and one or more other digital bead points in the new path vector. For instance, the chain pull painting system determines that one or more digital bead points move from previous positions to the updated positions based on the movement of the selected digital bead point. In one or more embodiments, the chain pull painting system determines updated positions of digital bead points at a plurality of intervals (e.g., time or distance intervals).

In one or more embodiments, the chain pull painting system generates one or more strokes from one or more digital bead points based on corresponding updated positions. In particular, the chain pull painting system generates a stroke from a previous position of a digital bead point to an updated position of the digital bead point. To illustrate, the chain pull painting system utilizes stroke parameters of the digital drawing path to generate one or more strokes based on the updated positions of the one or more digital bead points.

As mentioned, conventional image generation systems have a number of shortcomings in relation to efficiency, flexibility, and accuracy of operation. For example, some conventional systems provide tools for users to generate digital images with various artistic styles. In particular, some conventional systems provide intelligent tools (e.g., via machine-learning) for replicating some artistic styles, each of these tools is limited to use in replicating a specific artistic style. While such conventional systems provide tools that allow experienced users to imitate some artistic styles in digital visual media, these systems lack the ability to create other artistic styles, such as chain pull painting styles.

Some conventional systems also provide tools for experienced users to generate and edit digital images. Although tools for manually generating and editing digital images provides additional flexibility in reproducing certain artistic styles that the conventional systems cannot reproduce via machine-learning tools, accurately replicating some artistic styles via manual tools can be a very difficult and time consuming process. Specifically, manually reproducing a chain pull painting via conventional systems requires users to be skilled artists and knowledgeable users of digital image editing applications. Further, reproducing a chain pulling painting using existing tools of a digital illustrator application would require hundreds to thousands of individual user-directed computing inputs by a client device to even poorly imitate a chain pull painting.

The disclosed chain pull painting system provides a number of advantages over conventional systems. For example, the chain pull painting system improves the flexibility and efficiency of computing devices that implement digital image generation and editing. In contrast to conventional systems that cannot reproduce chain pull painting styles in digital images, the chain pull painting system provides automatic generation and animation of digital chain pull paintings. In particular, by converting a digital drawing path into a digital beaded chain including a plurality of digital bead points, the chain pull painting system accurately reproduces digital chain pull paintings within digital images with a realistic looking digital imitation of metal-chain-with-paint chain pull paintings.

Additionally, the chain pull painting system improves the efficiency of computing systems that implement digital image generation and editing. Specifically, in contrast to conventional systems that utilize computationally intensive machine-learning processes to automatically reproduce artistic styles, the chain pull painting system utilizes a fast and efficient method of generating and animating chain pull painting styles within digital images. For example, the chain pull painting system determines updated positions of digital bead points in real-time in response to input moving a selected digital bead point. Additionally, the chain pull painting system generates strokes within digital images based on the updated positions of the digital bead points. The chain pull painting system thus provides fast and automatic reproduction of chain pull paintings within digital images (with animation) without requiring users to have a deep knowledge of digital editing tools and significant artistic ability.

As used herein, the term "digital drawing path" refers to a digital representation of a straight line or curve in a digital image. For example, a digital drawing path includes a digitally painted or drawn line from a first point to a second point of a digital canvas in a digital image application. To illustrate, a digital drawing path includes a manually drawn path or a computationally generated path (e.g., a Bezier curve or spline). In some embodiments, a digital drawing path includes a line with distinct locations at ends of the line. Alternatively, a digital drawing path includes a closed shape with the beginning and ending location at the same location (e.g., thereby forming an enclosed area or areas).

As used herein, the term "digital path point" refers to a stored value along a digital drawing path that indicates a position or direction of the digital drawing path. For instance, a digital path point includes a captured point from an input to draw a digital drawing path in a digital image. In some embodiments, a digital path point includes a coordinate value in a vector of values (e.g., a path vector) that define a digital drawing path in a digital image.

As used herein, the term "digital chain pull painting" refers to an artistic style in a digital image in which at least a portion of a digital representation of a beaded chain is moved within a digital canvas and digitally paints or draws one or more additional strokes on the digital canvas. For example, a digital chain pull painting includes a digital representation of a plurality of digital strokes based on movement of a plurality of digital bead points of the digital representation of the beaded chain.

As used herein, the term "digital bead point" refers to a digital representation of a point corresponding to a bead along a beaded chain according to a digital drawing path. In particular, a digital bead point includes a stored position (e.g., a coordinate position) along a digital drawing path within a digital image. In one or more embodiments, a digital bead point is hidden from a user's view on a display device. In alternative embodiments, a digital bead point is displayed along a digital drawing path on a display device.

As used herein, the term "stroke" refers to a path drawn or painted in a digital image using a digital drawing/painting tool of a digital image application. For example, a stroke includes a line or curve drawn or painted from a first location to a second location in connection with movement of a digital bead point in a chain pull painting process. In one or more embodiments, a stroke includes drawing or painting attributes that determine a width, color, type etc., of the stroke in the digital image.

Turning now to the figures, FIG. 1 includes an embodiment of a system environment 100 in which an chain pull painting system 102 is implemented. In particular, the system environment 100 includes server device(s) 104 and a client device 106 in communication via a network 108. Moreover, as shown, the server device(s) 104 include a digital image system 110, which includes the chain pull painting system 102. Additionally, the client device 106 includes a digital image application 112, which optionally includes the digital image system 110 and the chain pull painting system 102.

As shown in FIG. 1, in one or more implementations, the server device(s) 104 includes or hosts the digital image system 110. Specifically, the digital image system 110 includes, or is part of, one or more systems that implement digital image processing. For example, the digital image system 110 provides tools for viewing, generating, editing, and/or otherwise interacting with digital images (e.g., visual media including digital images or digital videos). To illustrate, the digital image system 110 communicates with the client device 106 via the network 108 to provide the tools for display and interaction via the digital image application 112 at the client device 106. Additionally, in some embodiments, the digital image system 110 receives data from the client device 106 in connection with editing digital images, including requests to access digital images stored at the server device(s) 104 (or at another device such as a source repository) and/or requests to store digital images from the client device 106 at the server device(s) 104 (or at another device). In some embodiments, the digital image system 110 receives interaction data for viewing, generating, or editing a digital image from the client device 106, processes the interaction data (e.g., to view, generate, or edit a digital image), and provides the results of the interaction data to the client device 106 for display via the digital image application 112 or to a third-party system.

In one or more embodiments, the digital image system 110 provides tools for modifying digital images. In particular, the digital image system 110 provides tools (e.g., via the digital image application 112) for selecting, deleting, or adding content within a digital image. Additionally, the digital image system 110 utilizes the chain pull painting system 102 to automatically generate digital chain pull paintings in digital images. For example, the digital image system 110 utilizes the chain pull painting system 102 to convert digital drawing paths into digital beaded chains. Additionally, the digital image system 110 utilizes the chain pull painting system 102 to generate digital chain pull paintings using digital beaded chains (e.g., generated from digital drawing paths) in response to user input via the digital image application 112. In some embodiments, the chain pull painting system 102 also animates creation of digital chain pull paintings in real-time based on user input to move a digital drawing path.

In one or more embodiments, after generating a digital image including a digital chain pull painting utilizing the chain pull painting system 102, the digital image system 110 provides the digital images to the client device 106 for display. For instance, the digital image system 110 sends the digital image including the digital chain pull painting (or data such as a plurality of strokes in a digital canvas) to the client device 106 via the network 108 for display via the digital image application 112. Additionally, the client device 106 can receive additional inputs to apply additional changes to the digital chain pull painting or to insert additional digital chain pull paintings into the digital image (e.g., based on additional inputs to move one or more additional digital beaded chains in the digital image). The digital image system 110 utilizes the chain pull painting system 102 to further modify the digital image based on the additional inputs.

In one or more embodiments, the server device(s) 104 include a variety of computing devices, including those described below with reference to FIG. 10. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images). In some embodiments, the client device 106 also performs functions for generating, capturing, or accessing data to provide to the digital image system 110 and the chain pull painting system 102 in connection with editing digital images. For example, the client device 106 communicates with the server device(s) 104 via the network 108 to provide information (e.g., user interactions) associated with digital images. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the chain pull painting system 102 being implemented by a particular component and/or device within the system environment 100, the chain pull painting system 102 can be implemented, in whole or in part, by other computing devices and/or components in the system environment 100 (e.g., the client device 106).

In particular, in some implementations, the chain pull painting system 102 on the server device(s) 104 supports the chain pull painting system 102 on the client device 106. For instance, the server device(s) 104 generates the chain pull painting system 102 (e.g., one or more application components or plugins) for the client device 106. The server device(s) 104 provides the chain pull painting system 102 to the client device 106 for performing a chain pull painting process at the client device 106. In other words, the client device 106 obtains (e.g., downloads) the chain pull painting system 102 from the server device(s) 104. At this point, the client device 106 is able to utilize the chain pull painting system 102 to generate digital images including digital chain pull paintings independently from the server device(s) 104.

In alternative embodiments, the chain pull painting system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital chain pull painting operations, and, in response, the chain pull painting system 102 or the digital image system 110 on the server device(s) 104 performs operations to generate and/or edit digital images. The server device(s) 104 provide the output or results of the operations to the client device 106.

Figure 2:
FIG. 2 illustrates a diagram of the chain pull painting system generating a chain pull painting within a digital image in accordance with one or more implementations.

As mentioned, the chain pull painting system 102 generates digital chain pull paintings based on digital drawing paths in digital images. FIG. 2 illustrates an overview of the chain pull painting system 102 generating a digital chain pull painting in connection with movement of a portion of a digital drawing path. In particular, FIG. 2 illustrates the chain pull painting system 102 converting the digital drawing path to a digital beaded chain and generating the digital chain pull painting based on movement of the digital beaded chain.

In one or more embodiments, as illustrated in FIG. 2, the chain pull painting system 102 identifies a digital drawing path 200 in a digital image. For example, as mentioned, the digital drawing path 200 includes a path drawn or painted on a digital canvas of a digital image utilizing a drawing/painting tool. To illustrate, the digital drawing path 200 includes a raster path in a digital raster image or a vector path in a digital vector image. Additionally, in some embodiments, the digital drawing path 200 includes a path extracted from a digital image including a plurality of digital drawing paths (e.g., lines or shapes making up a larger object in the digital image).

Figure 3:
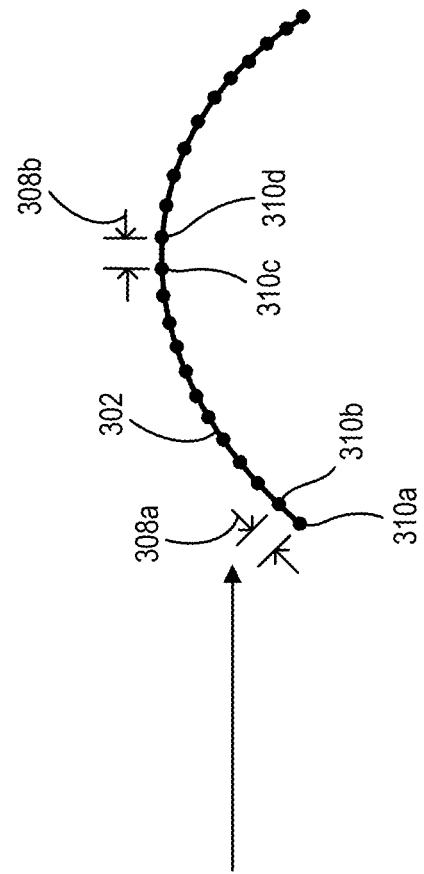
FIG. 3 illustrates a diagram of an overview of the chain pull painting system determining digital bead points for a digital drawing path in accordance with one or more implementations.
Figure 3:
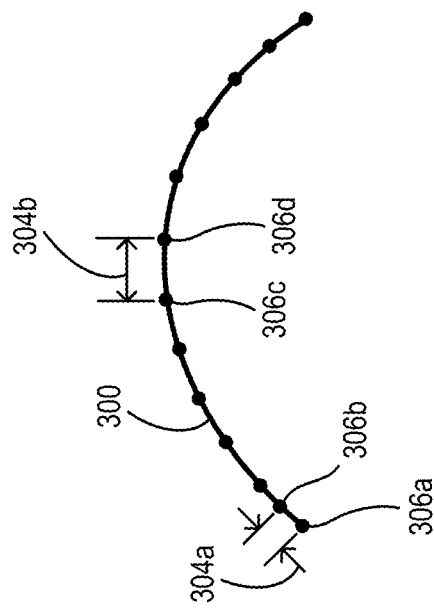

FIG. 2 further illustrates that the chain pull painting system 102 determines a digital beaded chain 202 based on the digital drawing path 200. For example, the chain pull painting system 102 determines the digital beaded chain 202 by determining a plurality of digital bead points along the digital drawing path 200. FIG. 3 and the corresponding description provide additional detail related to converting a digital drawing path to a digital beaded chain by determining digital bead points based on digital path points of the digital drawing path.

Figure 4:
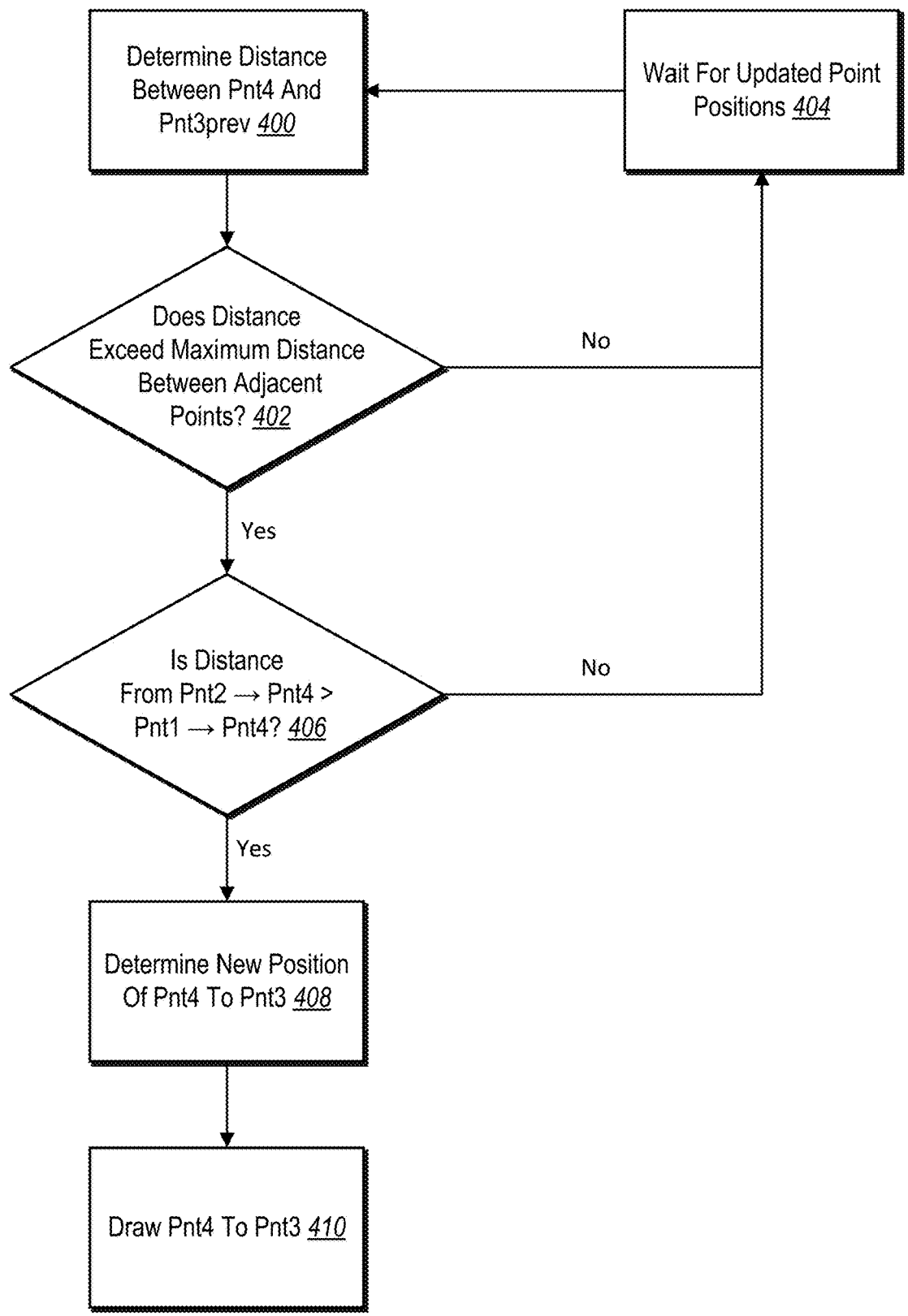
FIG. 4 illustrates a flow diagram of the chain pull painting system generating a stroke in a chain pull painting process in accordance with one or more implementations.

In addition, FIG. 2 illustrates that the chain pull painting system 102 generates a digital chain pull painting 204 in response to movement of at least a portion of the digital beaded chain 202. In particular, the chain pull painting system 102 generates the digital chain pull painting 204 including one or more strokes based on movement of one or more digital bead points in the digital beaded chain 202 in response to movement of a selected digital bead point. FIGS. 4-6 and the corresponding description provide additional detail with respect to generating a digital chain pull painting in response to movement of a selected digital bead point.

In one or more embodiments, the chain pull painting system 102 determines a plurality of digital bead points along a digital drawing path. FIG. 3 illustrates that the chain pull painting system 102 converts a digital drawing path 300 into a digital beaded chain 302. Specifically, FIG. 3 illustrates that the chain pull painting system 102 utilizes a plurality of digital path points in the digital drawing path 300 to determine a plurality of digital bead points that define the digital beaded chain.

In some embodiments, the chain pull painting system 102 determines the digital drawing path 300 including the plurality of digital path points. For example, the chain pull painting system 102 determines the digital path points of the digital drawing path 300 from a path vector that stores information associated with the digital path points. To illustrate, the chain pull painting system 102 determines the path vector based on a captured path vector stored when capturing the digital drawing path 300 based on an input. More specifically, the chain pull painting system 102 (or the digital image system 110 of FIG. 1) captures the digital drawing path 300 in response to an input via a drawing tool and stores a plurality of digital path points in a path vector.

In one or more embodiments, the chain pull painting system 102 captures digital path points according to a capture frequency of a client device or digital image application. For instance, the digital path points in the captured path vector are based on a polling rate or capture rate of an input device (e.g., a mouse or touchscreen) or based on preferences associated with the chain pull painting process. Accordingly, distances between the plurality of digital path points may vary according to the speed at which an input device draws (or otherwise inputs) the digital drawing path 300. To illustrate, a first distance 304*a* between a first digital path point 306*a* and a second digital path point 306*b* is different than a second distance 304*b* between a third digital bead point 306*c* and a fourth digital path point 306*d*. The first distance 304*a* may be less than the second distance 304*b* due to the input device inputting the digital drawing path 300 faster in connection with the second distance 304*b* than with the first distance 304*a*.

In other embodiments, the chain pull painting system 102 (or digital image system 110) captures the digital path points based on an initial point of the digital drawing path 300 and an ending point of the digital drawing path 300. For example, the chain pull painting system 102 determines the plurality of digital path points by subdividing the digital drawing path 300 at a plurality of coordinates along the digital drawing path 300. Additionally, the chain pull painting system 102 stores the digital path points based on the coordinates in a path vector.

According to one or more embodiments, in response to identifying the digital drawing path 300 (and in some cases the digital path points), the chain pull painting system 102 generates the digital beaded chain 302. In particular, the chain pull painting system 102 determines a plurality of digital bead points in the digital beaded chain 302 to represent beads along the digital beaded chain 302. For instance, the chain pull painting system 102 converts the digital drawing path 300 to the digital beaded chain 302 by determining the digital bead points from the digital path points.

To illustrate, the chain pull painting system 102 determines the digital bead points at distances equal to a predetermined bead point distance. In one or more embodiments, the chain pull painting system 102 uses the path vector including the digital path points to calculate the digital bead points. Specifically, the chain pull painting system 102 generates a new path vector including the digital bead points at coordinates including the predetermined bead point distance between each pair of digital bead points in the new path vector. For example, the chain pull painting system 102 adds or removes digital bead points in the new path vector to obtain a plurality of equidistant digital bead points (e.g., by replacing one or more digital path points in the new path vector at one or more different positions based on the predetermined bead point distance). In one or more embodiments, the predetermined bead point distance is based on a default distance value, user preferences, or a dynamic value based on the application.

As illustrated in FIG. 3, for example, the chain pull painting system 102 determines a first distance 308a between a first digital bead point 310a and a second digital bead point 310b of the digital beaded chain 302. Additionally, as illustrated, the chain pull painting system 102 determines a second distance 308b between a third digital bead point 310c and a fourth digital bead point 310d of the digital beaded chain 302. As shown, the first distance 308a and the second distance 308b are equal to the predetermined bead point distance.

In some embodiments, the chain pull painting system 102 determines a plurality of digital bead points by rearranging the path vector (or a copy of the path vector) of a digital drawing path to place a selected (e.g., pulled) digital path point at a first position of the path vector. To illustrate, if the selected digital path point is at an end of the digital drawing path point, the chain pull painting system 102 reverses the path vector to begin calculating digital bead points from the selected digital path point. The chain pull painting system 102 compares a distance between the first digital path point in the path vector and the next adjacent digital path point in the path vector to the predetermined digital bead point distance. For instance, the chain pull painting system 102 determines whether the distance is greater than, less than, or equal to the predetermined digital bead point distance. In response to determining that the distance is equal to the predetermined digital bead point distance, the chain pull painting system 102 keeps the selected digital path point in the path vector and moves to the subsequent digital path point.

According to one or more embodiments, in response to determining that the distance is greater than the predetermined bead point distance, the chain pull painting system 102 adds an additional digital path point to the path vector. For example, the chain pull painting system 102 adds a new digital path point to the path vector at the predetermined bead point distance from the processed digital path point. Thus, after adding the new digital path point to the path vector, the path vector includes the initial digital path point and the new digital path point at a distance equal to the predetermined bead point distance in adjacent vector values of the path vector. In one or more embodiments, adding the new digital path point includes adding coordinates to the path vector. In some embodiments, the chain pull painting system 102 adds the new digital path point according to scalar vector graphic configurations.

In one or more embodiments, in response to determining that the distance is less than the predetermined bead point distance, the chain pull painting system 102 removes the next adjacent digital path point from the path vector. In particular, the chain pull painting system 102 determines that the selected digital path point and the next adjacent digital path point are too close. Accordingly, the chain pull painting system 102 removes the next adjacent digital path point from the path vector while keeping the selected digital path point.

In response to removing a digital path point from the path vector, the chain pull painting system 102 determines a new distance between the selected digital path point and a new adjacent digital path point (e.g., previously separated from the selected digital path point by the removed digital path point). Specifically, the chain pull painting system 102 calculates the new distance between the selected digital path point and the new adjacent digital path point to determine whether the new distance is greater than, equal to, or less than the predetermined bead point distance. The chain pull painting system 102 determines whether to add or remove a digital path point in the path vector based on the new distance relative to the selected digital path point. In some instances, the chain pull painting system 102 removes more than one sequential digital path point due to corresponding distances from the selected digital path point being less than the predetermined bead point distance.

In one or more embodiments, in response to adding a digital path point, or otherwise in response to determining that the distance between the selected digital path point and the adjacent digital path point is equal to the predetermined bead point distance, the chain pull painting system 102 proceeds with processing the next digital path point in the path vector. To illustrate, if the chain pull painting system 102 determined that the distance between the selected digital path point and the adjacent digital path point is equal to the predetermined bead point distance, the chain pull painting system 102 uses the adjacent digital path point as the subsequently selected digital path point. Alternatively, if the chain pull painting system 102 added a new digital path point in response to the distance being greater than the predetermined bead point distance, the chain pull painting system 102 uses the new digital path point as the selected digital path point. The chain pull painting system 102 determines a new distance between the newly selected digital path point and the next adjacent digital path point in the path vector (e.g., a distance between the second and third digital bead points in the path vector).

According to one or more embodiments, the chain pull painting system 102 utilizes the following algorithm to determine positions of digital bead points based on digital path points in a digital drawing path.

1. Order points in a path vector based on a selected point (e.g., reversing the path vector based on a pulling end).
2. If the distance (dP) between the current point (cP) and the next point in the path vector (nP) is less than the predetermined bead point distance (r), remove the nP from the path vector.
  cP remains the same. Increment nP to the next point in the path vector. Repeat step 2.
3. Else if dP is greater than r, determine a new point at a distance equal to r from cP between cP and nP and insert the new point newP into the path vector between cP and nP. Determine newP as the current point cP while nP remains the same. Repeat the process starting from step 2.

In one or more embodiments, the chain pull painting system 102 generates newP by an internal division algorithm as follows:

$$newP_x = ((r * nP_x) + ((dP - r) * cP_x))/dP$$

$$newP_y = ((r * nP_y) + ((dP - r) * cP_y))/dP$$

in which the chain pull painting system 102 determines coordinates of the new point along the x-axis and the y-axis separately.

4. Else if dP equals r, set nP as cP and increment nP to the next point in the path vector. Repeat from step 2.
5. After traversing all points, reorder the points in the path vector according to an original order.

As indicated in the above algorithm, the chain pull painting system 102 generates a digital beaded chain including a plurality of digital bead points based on digital path points in a path vector of a digital drawing path. The resulting vector includes points corresponding to the positions of the digital bead points of the digital beaded chain.

In one or more alternative embodiments, the chain pull painting system 102 determines a plurality of digital bead points for a digital drawing path based on a first point and a last point of the digital drawing path. For instance, the chain pull painting system 102 utilizes the first point and the last point in the digital drawing path to determine a plurality of equidistant points between the first point and the last point. Specifically, the chain pull painting system 102 calculates a plurality of digital bead points by dividing the digital drawing path from the first point and the last point according to a predetermined bead point distance. In some instances, the chain pull painting system 102 relaxes the predetermined bead point distance by a threshold amount for one or more pairs digital bead points to result in a plurality of equidistant points along the digital drawing path based on the distance from the first point to the last point.

In one or more additional embodiments, the chain pull painting system 102 determines a plurality of sets of digital bead points based on a selected digital path point that is not at an end of a digital drawing path. In particular, in response to a selection of a digital path point in the middle (or approximately the middle) of a digital drawing path including a line or a shape, the chain pull painting system 102 generates two sets of digital bead points on either side of the selected digital path point. To illustrate, the chain pull painting system 102 generates a first set of digital bead points on a first side of the digital path point along the digital drawing path and a second set of digital bead points on a second side of the digital path point along the digital drawing path.

For example, the chain pull painting system 102 divides a path vector of the digital drawing path into two path vectors at (and including) the selected digital path point. Additionally, the chain pull painting system 102 orders the two path vectors based on the selected digital path point. More specifically, the chain pull painting system 102 orders a first path vector such that the selected digital path point is at a first position of the first path vector followed in order by the points to the first side of the selected digital path point. The chain pull painting system 102 also orders a second path vector such that the selected digital path point is at a first position of the second path vector followed in order by the points to the second side of the selected digital path point. Additionally, the chain pull painting system 102 determines the digital bead points for the separate path vectors utilizing one of the previously mentioned processes.

In one or more embodiments, the chain pull painting system 102 divides a digital drawing path that forms an enclosed shape into two path vectors based on a selected digital path point. For instance, the chain pull painting system 102 determines the first location of each path vector as the selected digital path point. The chain pull painting system 102 also separates the remaining digital path points into the separate path vectors based on a number and/or distance of the remaining digital path points from the selected digital path point along the digital drawing path. To illustrate, the chain pull painting system 102 divides the shape into two parts of equal length based on the selected digital path point. Accordingly, the chain pull painting system 102 determines the digital bead points for each of the resulting path vectors separately.

According to one or more embodiments, the chain pull painting system 102 generates a digital chain pull painting for a digital beaded chain based on movement of one or more digital bead points. FIGS. 4-6 illustrate the chain pull painting system 102 generating strokes for on one or more digital bead points in a digital beaded chain based on movement of a selected digital bead point. In particular, FIGS. 4-6 illustrate that the chain pull painting system 102 determines updated positions of digital bead points in connection with the movement of the selected digital bead point.

FIG. 4 illustrates a flow diagram of a process for generating a digital chain pull painting for a digital beaded point. In particular, FIG. 4 illustrates that the chain pull painting system 102 determines whether to update a position of a digital bead point according to a plurality of condition requirements in connection with movement of a selected digital bead point (e.g., a pulled point). FIG. 4 also illustrates that the chain pull painting system 102 determines an updated position for a digital bead point and draws a stroke based on the updated position.

In one or more embodiments, the chain pull painting system 102 initiates the process for generating a stroke for a digital bead point by performing an act 400 of determining a distance between a digital bead point ("Pnt4" in FIG. 4) and an updated position of a previous digital bead point in the digital beaded chain ("Pnt3prev" in FIG. 4). Specifically, the chain pull painting system 102 calculates a distance between a currently processed digital bead point and the new position of a previously processed digital bead point (e.g., based on a path vector). For instance, in response to an input to move a selected digital bead point to a new position, the chain pull painting system 102 determines whether the movement of the selected digital bead point causes the distance between the previous digital bead point and the currently processed digital bead point to change.

In response to determining the distance between the current digital bead point and the updated position of the previous digital bead point, the chain pull painting system 102 determines whether the distance meets a threshold. In particular, as illustrated in FIG. 4, the chain pull painting system 102 performs an act 402 of determining whether the distance exceeds the maximum distance between adjacent points in the digital beaded chain. More specifically, the chain pull painting system 102 determines whether the distance between the current digital bead point and the updated position of the previous digital bead point is greater than the predetermined bead point distance. To illustrate, the chain pull painting system 102 treats the predetermined bead point distance as a maximum physical distance (e.g., based on a digital representation of a physical link) between two digital bead points.

In one or more embodiments, in response to determining that the distance does not exceed the maximum distance between adjacent points, the chain pull painting system 102 performs an act 404 of waiting for updated point positions. For example, the chain pull painting system 102 continues to monitor movements of digital bead points in the digital beaded chain until the distance between the current point and the updated position of the previous point exceeds the maximum distance between adjacent points. If the distance between the current digital bead point and the updated position of the previous digital bead point does not exceed the maximum distance, the chain pull painting system 102 maintains the current digital bead point in the same position (e.g., the chain pull painting system 102 does not update the position of the current digital bead point).

According to one or more embodiments, in response to determining that the distance exceeds the maximum distance between adjacent points, the chain pull painting system 102 performs an act 406 of determining whether a distance between the selected digital bead point and the current digital bead point increases in response to movement of the selected digital bead point. Specifically, the chain pull painting system 102 determines a distance between the current digital bead point and the original position of the selected digital bead point (e.g., the pulled point). The chain pull painting system 102 also determines a distance between the current digital bead point and the updated position of the selected digital bead point.

In one or more embodiments, in response to determining that the distance between the current digital bead point and the selected digital bead point does not increase based on movement of the selected digital bead point, the chain pull painting system 102 returns to act 404 of waiting for updated point positions. In particular, the chain pull painting system 102 continues to monitor movement of the selected digital bead point to detect if the distance between the current digital bead point and the selected digital bead point increases. By preventing movement of the current digital bead point if the calculated distance does not increase, the chain pull painting system 102 accounts for situations in which the selected digital bead point is pulled toward the current digital bead point (or otherwise not away from the current digital bead point).

According to one or more embodiments, in response to determining that the distance between the current digital bead point and the selected digital bead point increases, the chain pull painting system 102 performs an act 408 of determining a new position ("Pnt3") of the current digital bead point ("Pnt4"). Specifically, the chain pull painting system 102 determines an updated position of the current digital bead point based on the new position of the selected digital bead point. More specifically, as described in more detail below with respect to FIGS. 5A-5B and FIG. 6, the chain pull painting system 102 moves the current digital bead point to a new position in a direction of the selected digital bead point.

In one or more embodiments, as illustrated in FIG. 4, the chain pull painting system 102 performs an act 410 of drawing a stroke from the current digital bead point ("Pnt4") to the updated position of the current digital bead point ("Pnt3"). For instance, the chain pull painting system 102 generates a digital drawing path from Pnt4 to Pnt3. To illustrate, the chain pull painting system 102 utilizes selected stroke attributes (e.g., based on a selected tool or based on the original digital drawing path) to draw the stroke from Pnt4 to Pnt3.

Figure 5B:
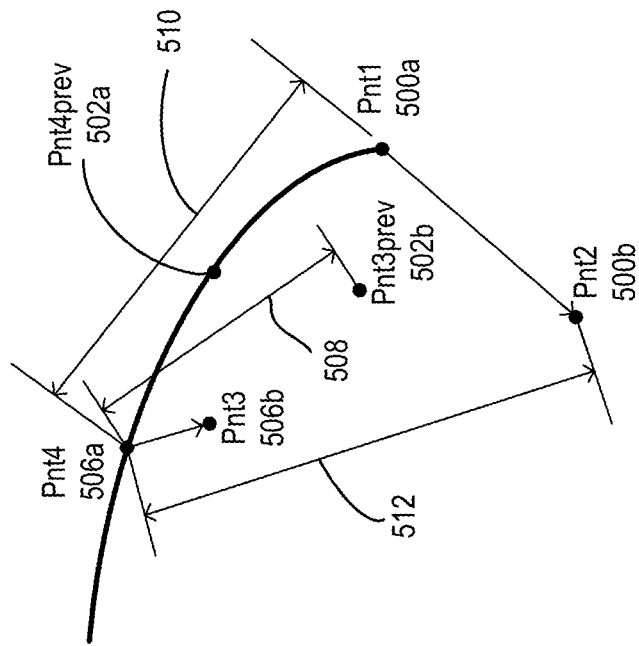
FIGS. 5A-5B illustrate diagrams of the chain pull painting system determining updated positions of digital bead points of a digital drawing path in accordance with one or more implementations.
Figure 5A:
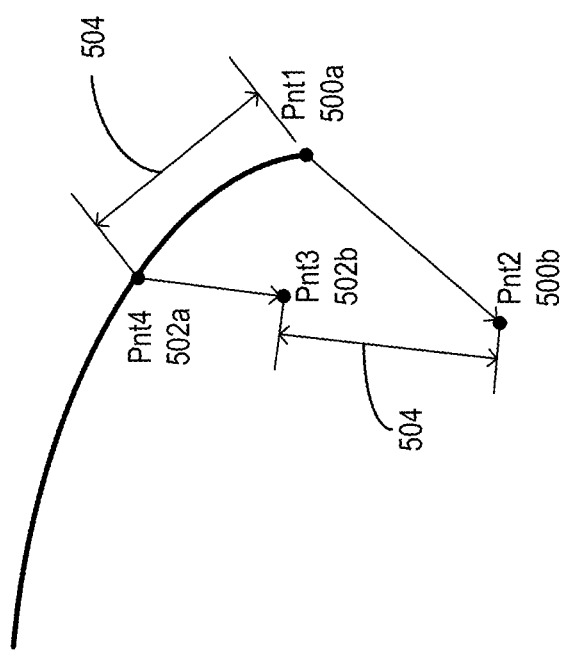
Figure 6:
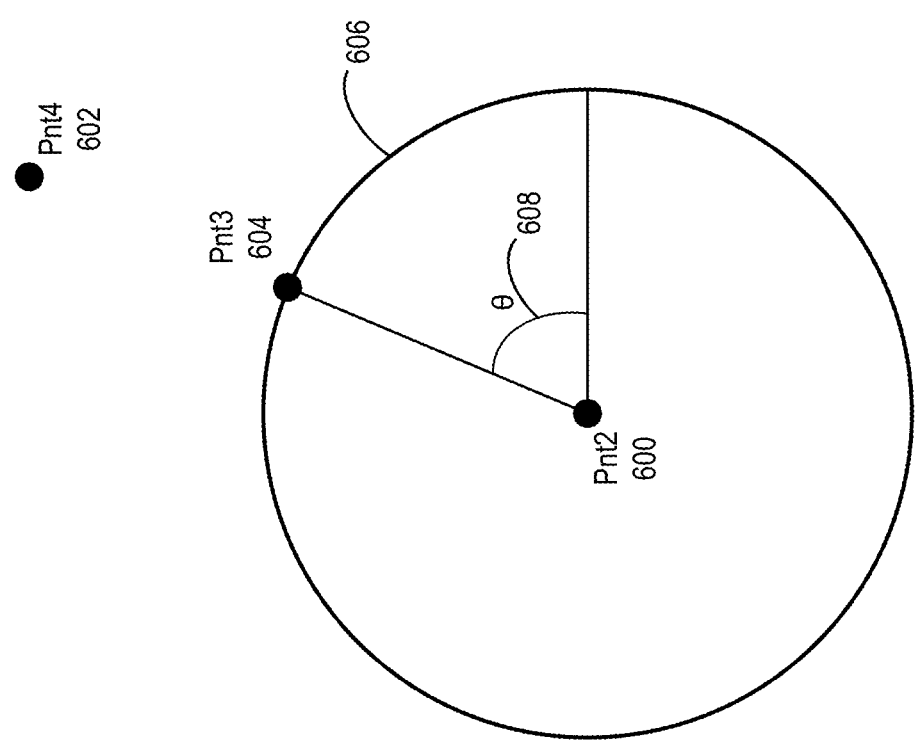
FIG. 6 illustrates a diagram of the chain pull painting system determining an updated position of a digital bead point in accordance with one or more implementations.

FIGS. 5A-5B illustrate examples of the chain pull painting system 102 determining updated positions for digital bead points in response to movement of a first digital bead point 500a ("Pnt1") to a new position 500b ("Pnt2"). In particular, FIG. 5A illustrates an example of the chain pull painting system 102 determining movement of a second digital bead point 502a ("Pnt4") to an updated position 502b ("Pnt3") based on movement of the first digital bead point 500a. As mentioned, in one or more embodiments, the chain pull painting system 102 determines whether movement of the first digital bead point 500a meets conditions for moving the second digital bead point 502a. As illustrated, the first digital bead point 500a includes a selected (e.g., pulled) digital bead point in the digital beaded chain. Additionally, the chain pull painting system 102 determines the second digital bead point 502a based on the next adjacent digital bead point in a path vector for the digital beaded chain.

According to one or more embodiments, the chain pull painting system 102 determines a first distance 504 between the first digital bead point 500a and the second digital bead point 502a. To illustrate, because the first digital bead point 500a and the second digital bead point 502a are adjacent within the path vector prior to movement of the digital beaded chain, the first distance 504 is equal to a predetermined bead point distance (e.g., a maximum allowable distance between adjacent digital bead points). Additionally, the chain pull painting system 102 calculates the first distance 504 based on a previously stored distance value between the first digital bead point 500a and the second digital bead point 502a. Alternatively, the chain pull painting system 102 calculates the first distance 504 by determining a Euclidean distance or a distance along a line or curve between the first digital bead point 500a and the second digital bead point 502a.

In one or more embodiments, the chain pull painting system 102 determines that a distance between the second digital bead point 502a and the new position 500b of the first digital bead point is greater than the first distance 504. For example, the chain pull painting system 102 determines that moving the first digital bead point 500a to the new position 500b results in a greater distance from the new position 500b to the second digital bead point 502a greater than the predetermined bead point distance. Furthermore, because the first digital bead point 500a corresponds to the pulled point, the chain pull painting system 102 determines that moving the first digital bead point 500a results in the second digital bead point 502a meeting the conditional requirements for moving the second digital bead point 502a.

According to one or more embodiments, the chain pull painting system 102 determines an updated position 502b of the second digital bead point 502a based on the new position 500b of the first digital bead point 500a. In particular, the chain pull painting system 102 determines the updated position 502b by moving the second digital bead point 502a toward the new position 500b. To illustrate, the chain pull painting system 102 determines the updated position 502b of the second digital bead point 502a at the first distance 504 away from the new position 500b of the first digital bead point 500a.

FIG. 5B illustrates an example of the chain pull painting system 102 processing an additional digital bead point in the digital beaded chain based on the movement of the first digital bead point 500a. In one or more embodiments, in response to determining the updated position 502b for the second digital bead point 502a, the chain pull painting system 102 increments a processed digital bead point to the next digital bead point in the path vector. For instance, the chain pull painting system 102 selects a third digital bead point 506a as the current digital bead point ("Pnt4"). Accordingly, the chain pull painting system 102 updates Pnt4 by incrementing Pnt4 to the next value in the path vector. Furthermore, the first digital bead point 500a remains as the pulled digital path point ("Pnt1") for determining whether the current digital path point meets the conditional requirements for moving the current digital path point.

In one or more embodiments, the chain pull painting system 102 determines whether the third digital bead point 506a meets the conditional requirements to move the third digital bead point 506a to an updated position 506b of the current digital bead point ("Pnt3" in FIG. 5B) of the third digital bead point 506a. Specifically, the chain pull painting system 102 performs the process described above with respect to FIG. 4 to determine whether and where to move the third digital bead point 506a in response to movement of the first digital bead point 500a. More specifically, the chain pull painting system 102 determines whether movement of the first digital bead point 500a and/or movement of the second digital bead point 502a results in movement of the third digital bead point 506a.

According to one or more embodiments, the chain pull painting system 102 utilizes movement of the second digital bead point 502a to a new position ("Pnt3prev") of a previous digital bead point ("Pnt4prev") to determine whether to move the third digital bead point 506a. In particular, as illustrated in FIG. 5B, the previous digital bead point is the second digital bead point 502a of FIG. 5A. Additionally, the new position of the previous digital bead point is the updated position 502b of the second digital bead point 502a. Thus, the chain pull painting system 102 determines whether a distance 508 between the third digital bead point 506a and the updated position 502b of the second digital bead point 502a exceeds the predetermined bead point distance.

In some embodiments, the chain pull painting system 102 also determines a plurality of distances between the third digital bead point 506a relative to the first digital bead point 500a and the new position 500b of the first digital bead point 500a. Specifically, the chain pull painting system 102 determines a first additional distance 510 between the third digital bead point 506a and the first digital bead point 500a. The chain pull painting system 102 also determines a second additional distance 512 between the third digital bead point 506a and the new position 500b of the first digital bead point 500a. The chain pull painting system 102 determines whether the second additional distance 512 exceeds the first additional distance 510.

In response to determining that movement of the first digital bead point 500a and the second digital bead point 502a results in the third digital bead point 506a meeting the conditional requirements, the chain pull painting system 102 determines the updated position 506b of the third digital bead point 506a. For instance, the chain pull painting system 102 determines the updated position 506b of the third digital bead point 506a based on the new position 500b of the first digital bead point 500a. To illustrate, the chain pull painting system 102 determines the updated position 506b of the third digital bead point 506a in a direction of the new position 500b of the first digital bead point 500a. More particularly, the chain pull painting system 102 determines the updated position 506b at a distance equal to the first additional distance 510 between the third digital bead point 506a and the first digital bead point 500a.

Although FIGS. 5A and 5B illustrate embodiments in which the chain pull painting system 102 determines movement of two digital bead points in sequential values of a path vector sequentially after a pulled digital bead point, the chain pull painting system 102 also performs the above process for each additional digital bead point in the path vector. For example, the chain pull painting system 102 determines, for each current digital bead point, whether a distance to an updated position of the previous digital bead point exceeds a predetermined bead point distance. The chain pull painting system 102 also determines, for each current digital bead point, whether a distance to the new position of the pulled digital bead point exceeds the original distance between the current digital bead point and the pulled digital bead point. In response to determining that both conditions are met, the chain pull painting system 102 determines an updated position of the current digital bead point.

Additionally, the chain pull painting system 102 determines whether each successive movement of a pulled digital bead point results in movement of additional digital bead points in the digital beaded chain. For instance, the chain pull painting system 102 determines a plurality of new positions of a pulled digital bead point at a plurality of different times (e.g., a plurality of predetermined times or distances). The chain pull painting system 102 uses the plurality of new positions to repeatedly update positions of the other digital bead points in the digital beaded chain. Accordingly, the chain pull painting system 102 continually draws one or more strokes in real-time in accordance with movement of the pulled digital bead point.

According to one or more embodiments, the chain pull painting system 102 determines whether to generate an updated position of a current digital bead point Pnt4 according to the following conditional requirements below.

1. The distance between the new position of the previous digital bead point Pnt3prev and Pnt4 is greater than the predetermined bead point distance r as: dist(Pnt3prev, Pnt4)>r.
2. The distance between Pnt2 and Pnt4 is greater than the distance between Pnt1 and Pnt4 as: dist(Pnt2, Pnt4)>dist(Pnt1, Pnt4).

In response to determining that both conditional requirements are met, the chain pull painting system 102 determines the new position of the current digital bead point. Furthermore, in response to determining that one or both of the above conditions are not met, the chain pull painting system 102 determines not to move the current digital bead point. The chain pull painting system 102 also determines that the rest of the digital bead points in the path vector after the current digital bead point do not move.

FIG. 6 illustrates an example of the chain pull painting system 102 determining a new position of a digital bead point during a chain pull painting process. As mentioned, in one or more embodiments, the chain pull painting system 102 determines an updated position of a digital bead point in a direction of a pulled digital bead point. Specifically, the chain pull painting system 102 determines a new position 600 ("Pnt2") of a pulled digital bead point. The chain pull painting system 102 also determines a current position 602 ("Pnt4") of a current digital bead point. The chain pull painting system 102 utilizes the new position 600 of the pulled digital bead point and the current position 602 of the current digital bead point to determine an updated position 604 ("Pnt3") of the current digital bead point.

In one or more embodiments, the chain pull painting system 102 determines the updated position 604 by moving the current digital bead point toward the new position 600 of the pulled digital bead point. Additionally, the chain pull painting system 102 maintains the same distance from the pulled digital bead point as the pulled digital bead point moves. In particular, as illustrated in FIG. 6, the chain pull painting system 102 determines a radius 606 equal to the previous distance d centered at the new position 600. The chain pull painting system 102 also determines an angle 608 based on the new position 600 of the pulled digital bead point and the current position 602 of the current digital bead point. The chain pull painting system 102 uses the radius 606 and the angle 608 to determine the updated position 604 of the current digital bead point.

According to one or more embodiments, the chain pull painting system 102 determines the radius 606 and angle 608 based on the following:

$$d = \text{dist}(\text{Pnt1}, \text{Pnt4})$$

$$\tan \theta = \|(\text{Pnt4}_y - \text{Pnt2}_y)/(\text{Pnt4}_x - \text{Pnt2}_x)\|$$

Additionally, the chain pull painting system 102 determines possible (x, y) coordinates (or the absolute distances along the x-axis and y-axis from Pnt2) using the equation of a circle with center at the new position 600 of the pulled digital bead point as:

$$x = d * \cos \theta$$

$$y = d * \sin \theta$$

Furthermore, the chain pull painting system 102 determines the updated position 604 from a plurality of possible points corresponding to the four quadrants of the circle according to the following conditions for the x-axis:
if $\text{Pnt2}_x \leq \text{Pnt4}_x$
    $\text{Pnt3}_x = \text{Pnt2}_x + x$
else
    $\text{Pnt3}_x = \text{Pnt2}_x - x$
Similarly, for the y-axis:
if $\text{Pnt2}_y \leq \text{Pnt4}_y$
    $\text{Pnt3}_y = \text{Pnt2}_y + y$
else
    $\text{Pnt3}_y = \text{Pnt2}_y - y$
The chain pull painting system 102 then determines the updated position 604 according to the determined coordinates for the x-axis and the y-axis. The chain pull painting system 102 also propagates updated positions through the digital beaded chain. The chain pull painting system 102 also determines such updated coordinates propagated throughout the digital beaded chain for each delta in the pulled digital bead point.

In additional embodiments, the chain pull painting system 102 determines and updates digital bead points based on non-equidistant digital path points. Specifically, the chain pull painting system 102 utilizes a plurality of stored digital path points as digital bead points without adding or removing additional digital bead points in a path vector. The chain pull painting system 102 updates the digital bead points based on movement of a selected digital bead point based on the stored distances between points. Accordingly, rather than using a single predetermined bead point distance, the chain pull painting system 102 utilizes separate distance values for each pair of digital bead points to determine whether and how to update the positions of the digital bead points in response to a movement of a selected digital bead point.

As described in relation to FIGS. 4, 5A-5B, and 6, the chain pull painting system 102 performs operations for converting image layer data from a formatting for one image application to a formatting for generating chain pull paintings from digital drawing paths in digital images. The operations include the chain pull painting system 102 determining digital beaded chains from digital drawing paths and determining updated positions of digital bead points in the digital beaded chains based on movement of a digital bead point. The acts and operations illustrated and described above in relation to FIG. 4 provide the corresponding acts for a step for determining an updated position of a digital bead point of the plurality of digital bead points.

Figure 7A:
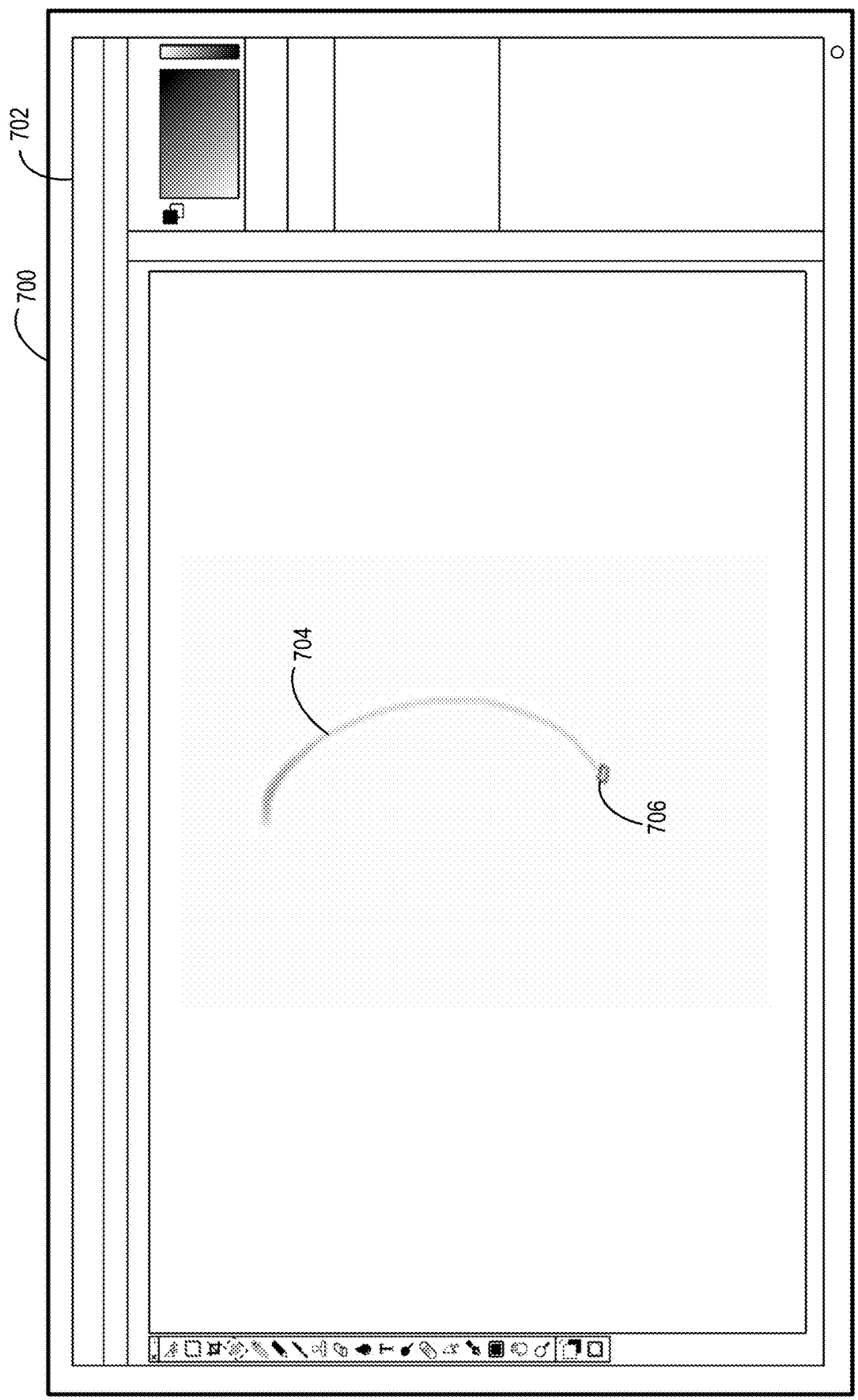
FIGS. 7A-7B illustrate graphical user interfaces for a digital chain pull painting in accordance with one or more implementations.

FIGS. 7A-7B and 8A-8B illustrate graphical user interfaced including digital drawing paths and corresponding digital chain pull paintings based on inputs to pull portions of the digital drawing paths. Specifically, FIG. 7A illustrates a graphical user interface of a client device 700 including a digital image application 702. For example, as illustrated, the client device 700 displays a plurality of tools for providing one or more inputs within the digital image application 702. According to one or more embodiments, the client device 700 displays a digital canvas for generating and/or editing digital images.

To illustrate, the client device 700 displays tools for inserting digital drawing paths into a digital image. In one or more embodiments, the client device 700 receives input to draw a digital drawing path 704 on the digital canvas for the digital image. For example, the tools include digital paintbrushes or pencils to generate digital brushstrokes or digital pencil lines on a digital canvas. Accordingly, the digital drawing path 704 includes a digital brushstroke or other line or shape inserted on the digital canvas according to the selected tool. Furthermore, in one or more embodiments, the digital drawing path 704 includes stroke attributes, such as color, pattern, and width (e.g., static width or variable width).

Additionally, in one or more embodiments, the client device 700 captures a plurality of digital path points for the digital drawing path 704. For instance, the chain pull painting system 102 captures the digital path points in connection with an input device and/or the digital image application 702. The client device 700 stores the digital path points of the digital drawing path 704 in a path vector associated with the digital image. In some embodiments, the client device 700 (e.g., via the digital image application 702) utilizes the path vector to perform various operations associated with digital image editing, including, but not limited to, performing undo/redo operations, modifying path attributes, modifying layers, or generating a digital image file based on the digital image.

FIG. 7A also illustrates that the digital drawing path 704 includes a selected point 706. To illustrate, the selected point 706 includes an end point of the digital drawing path 704 (e.g., the final point in the digital drawing path 704) based on the input of the digital drawing path 704. Alternatively, the selected point 706 includes a beginning point of the digital drawing path 704 or any other point along the digital drawing path 704 according to an input to indicate the selected point 706. The client device 700 can determine the selected point 706 in connection with a request to generate a digital chain pull painting using the digital drawing path 704.

Figure 7B:
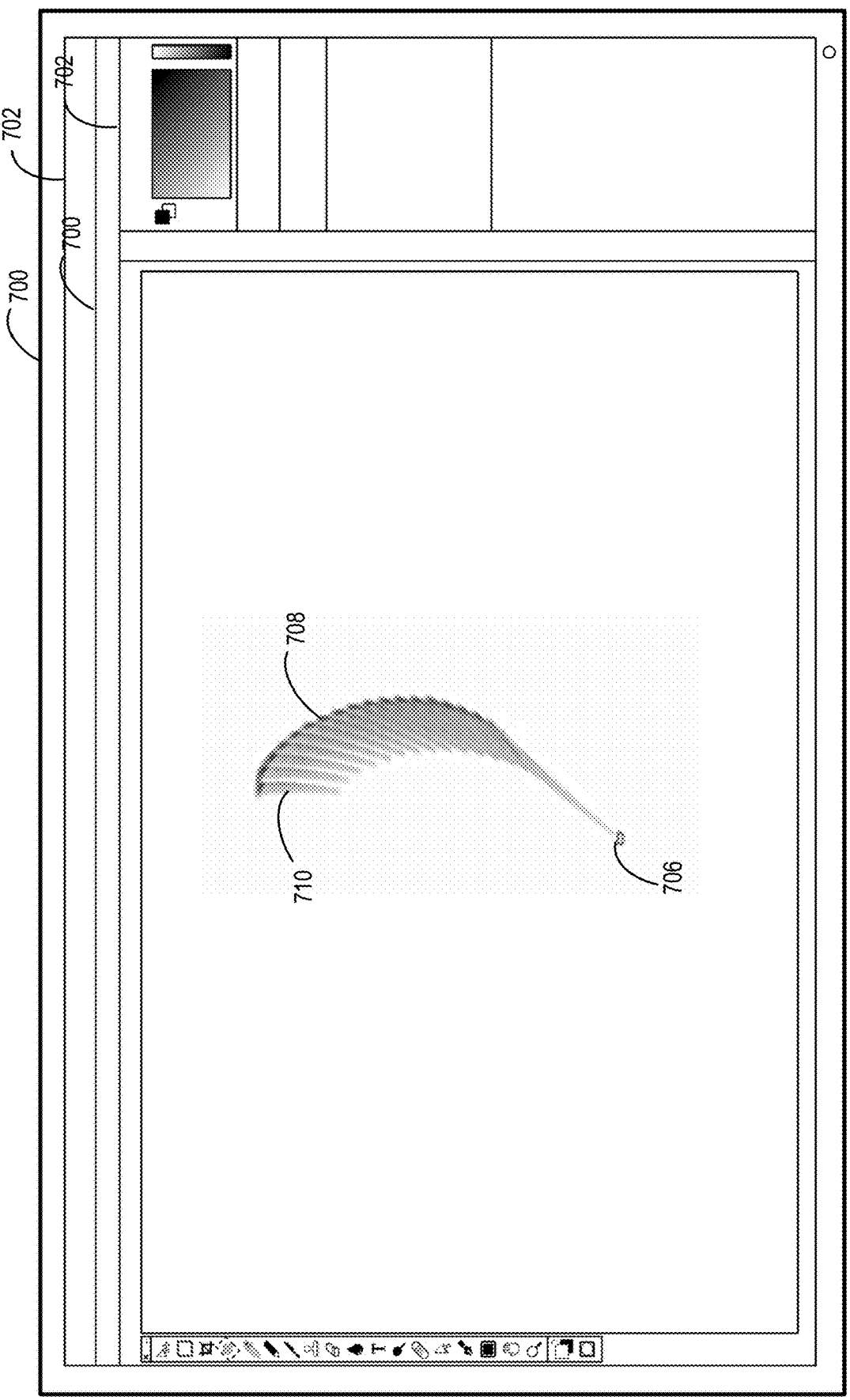

In response to detecting a movement of a portion of the digital drawing path 704 in connection with a request to generate a digital chain pull painting, the chain pull painting system 102 generates/animates a digital chain pull painting. FIG. 7B illustrates a digital chain pull painting 708 based on the digital drawing path 704. In particular, the chain pull painting system 102 determines a plurality of digital bead points for the digital drawing path 704 in connection with the request to generate the digital chain pull painting 708.

According to one or more embodiments, the chain pull painting system 102 generates the digital chain pull painting 708 by determining updated positions of the digital bead points based on movement of the selected point 706. In particular, as illustrated, the chain pull painting system 102 determines the updated positions for the plurality of digital bead points and draws a plurality of strokes on the digital canvas. To illustrate, the chain pull painting system 102 generates a stroke 710 for a digital bead point from an original position of the digital bead point to one or more updated positions of the digital bead point. By continually updating the positions of the digital bead points and drawing strokes based on the updated positions, the chain pull painting system 102 accurately reproduces the digital chain pull painting 708 on the client device 700, including any curves in the generated strokes resulting from the updated movements of the selected point 706.

In additional embodiments, the chain pull painting system 102 generates the strokes including one or more stroke parameters. For example, the chain pull painting system 102 utilizes the stroke parameters of the digital drawing path 704 to generate the strokes from the digital bead points. As illustrated in FIG. 7B, for example, the chain pull painting system 102 utilizes a stroke color and a stroke pattern associated with the digital drawing path 704 to generate the strokes in the digital chain pull painting 708.

Additionally, in some embodiments, the chain pull painting system 102 utilizes one or more stroke attributes associated with generating digital chain pull paintings or other digital paintings to generate the strokes. To illustrate, the chain pull painting system 102 replicates real-world paint by gradually reducing a diameter of a stroke while continuing to draw the stroke. The chain pull painting system 102 thus applies the gradually reducing diameter of each stroke corresponding to each digital bead point during a chain pull painting process. Accordingly, as illustrated in FIG. 7B, each stroke may start with a first diameter or width that gradually reduces as the chain pull painting system 102 continues drawing the stroke.

Figure 8A:
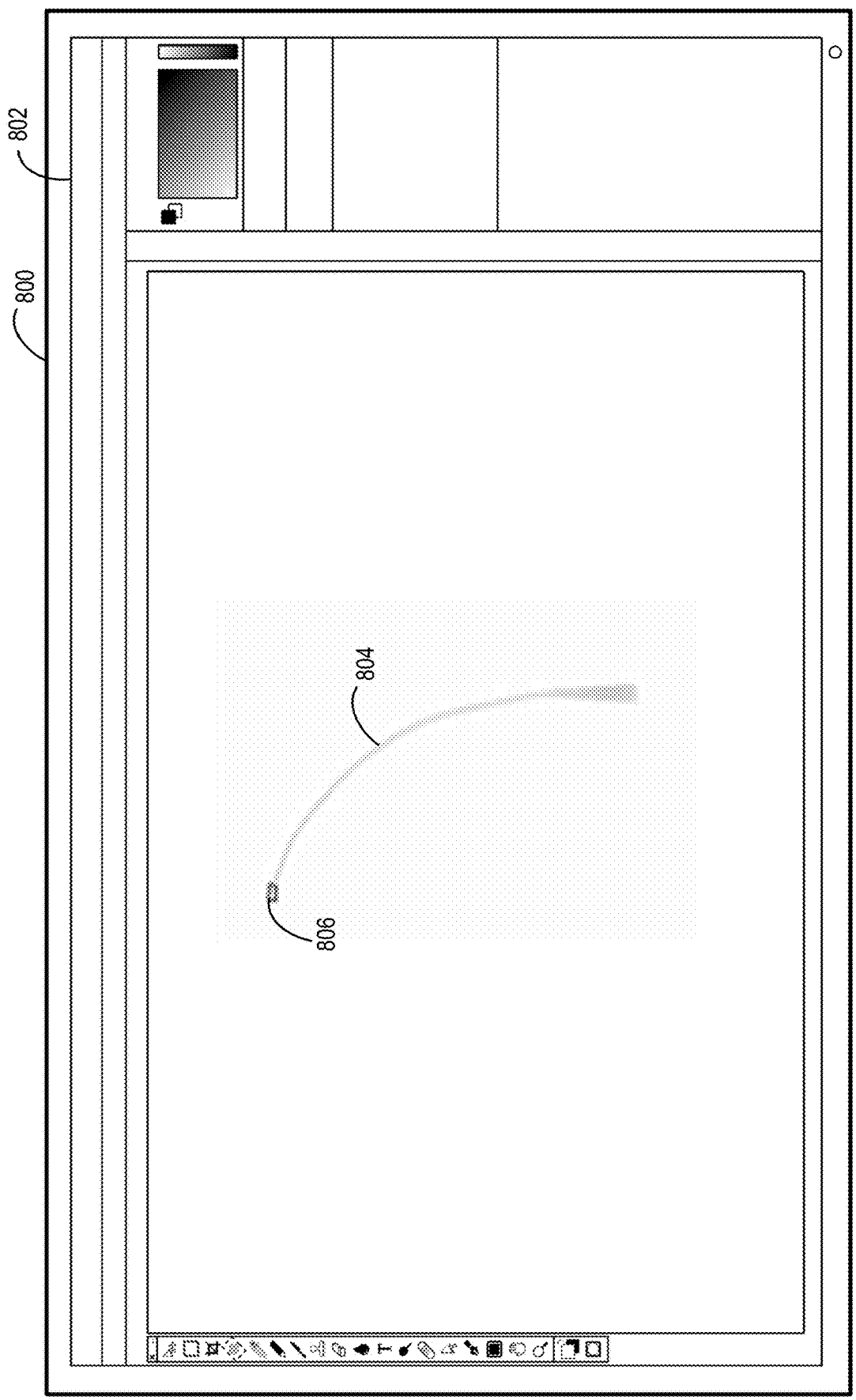
FIGS. 8A-8B illustrate graphical user interfaces for a digital chain pull painting in accordance with one or more implementations.
Figure 8B:
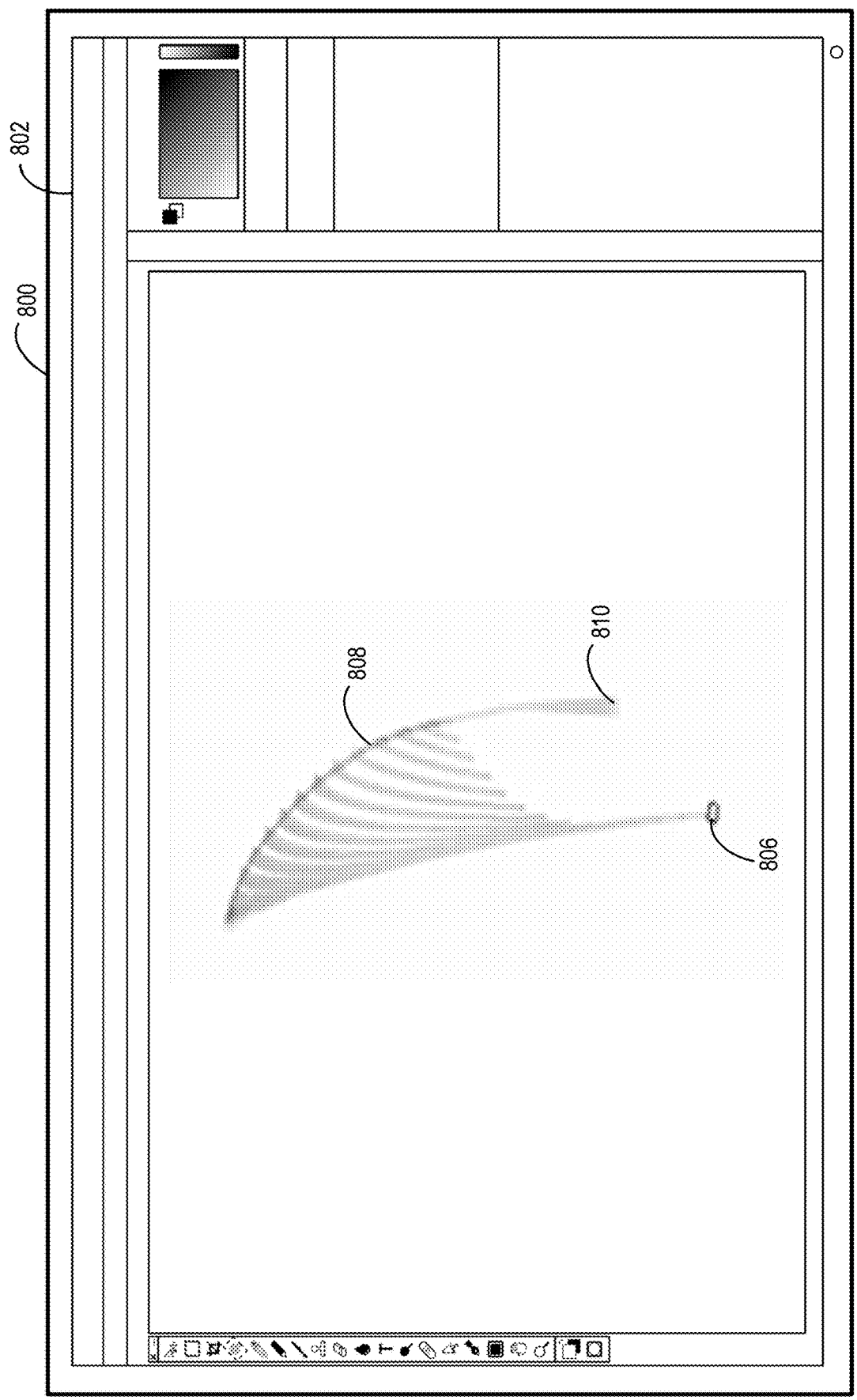

FIGS. 8A-8B illustrate an additional embodiment in which the chain pull painting system 102 generates a digital chain pull painting within a digital image. For example, FIG. 8A illustrates a graphical user interface of a client device 800 that includes a digital image application 802. Specifically, FIG. 8A illustrates that the client device 800 displays a digital drawing path 804 drawn on a digital canvas for a digital image. As shown, the digital drawing path 804 includes a digitally drawn brushstroke.

Furthermore, FIG. 8A illustrates that the digital drawing path 804 includes a selected point 806 at an end of the digital drawing path 804. As previously mentioned, movement of a selected point may or may not result in movement of other digital bead points in a digital beaded chain. More specifically, the chain pull painting system 102 determines whether movement of the selected point 806 results in movement of each digital bead point in the digital beaded chain. The chain pull painting system 102 also determines whether movement of subsequent digital bead points result in movement of following digital bead points.

FIG. 8B illustrates that the client device 800 displays a digital chain pull painting 808 that the chain pull painting system 102 generates based on movement of the selected point 806. In particular, as illustrated, movement of the selected point 806 results in the chain pull painting system 102 generating a plurality of strokes from original positions of digital bead points to updated positions of the digital bead points. Additionally, as illustrated, the chain pull painting system 102 determines that movement of the selected point does not result in movement of one or more digital bead points. To illustrate, the movement of the selected point 806 is closer to one or more digital bead points (e.g., the selected point 806 of the digital beaded chain is pulled in toward an opposite end 810 of the digital beaded chain), thereby resulting in the digital bead points not meeting the conditional requirements for their respective movement.

Figure 9:
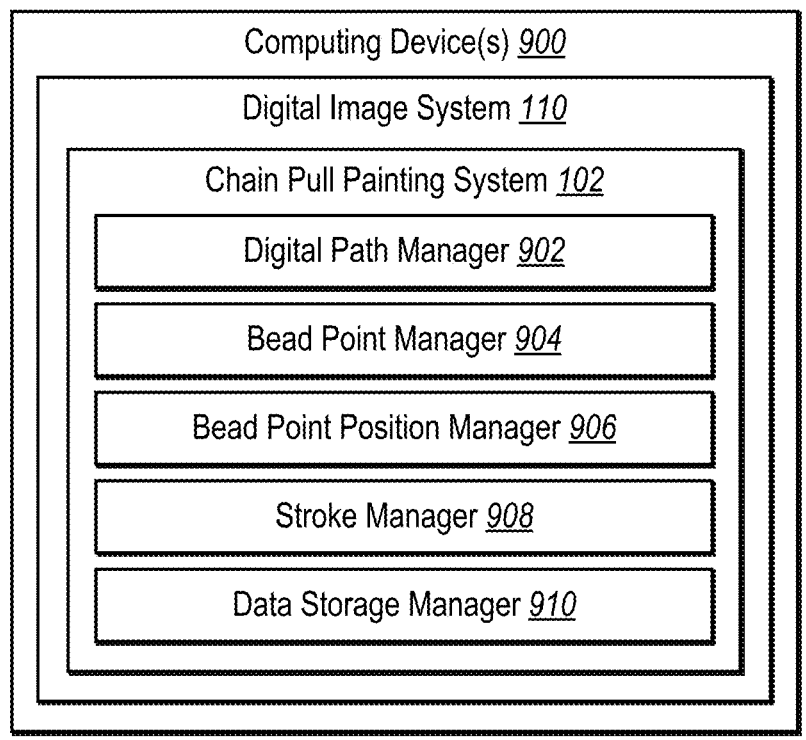
FIG. 9 illustrates a diagram of the chain pull painting system of FIG. 1 in accordance with one or more implementations.

FIG. 9 illustrates a detailed schematic diagram of an embodiment of the chain pull painting system 102 described above. As shown, the chain pull painting system 102 is implemented in a digital image system 110 on computing device(s) 900 (e.g., a client device and/or server device as described in FIG. 1, and as further described below in relation to FIG. 11). Additionally, the chain pull painting system 102 includes, but is not limited to, a digital path manager 902, a bead point manager 904, a bead point position manager 906, a stroke manager 908, and a data storage manager 910. The chain pull painting system 102 can be implemented on any number of computing devices. For example, the chain pull painting system 102 can be implemented in a distributed system of server devices for generating digital image content. The chain pull painting system 102 can also be implemented within one or more additional systems. Alternatively, the chain pull painting system 102 can be implemented on a single computing device such as a single client device.

In one or more embodiments, each of the components of the chain pull painting system 102 is in communication with other components using any suitable communication technologies. Additionally, the components of the chain pull painting system 102 are capable of being in communication with one or more other devices including other computing devices of a user, server devices (e.g., cloud storage devices), licensing servers, or other devices/systems. It will be recognized that although the components of the chain pull painting system 102 are shown to be separate in FIG. 9, any of the subcomponents may be combined into fewer components, such as into a single component, or divided into more components as may serve a particular implementation. Furthermore, although the components of FIG. 9 are described in connection with the chain pull painting system 102, at least some of the components for performing operations in conjunction with the chain pull painting system 102 described herein may be implemented on other devices within the environment.

In some embodiments, the components of the chain pull painting system 102 include software, hardware, or both. For example, the components of the chain pull painting system 102 include one or more instructions stored on a computer-readable storage medium and executable by processors of one or more computing devices (e.g., the computing device(s) 900). When executed by the one or more processors, the computer-executable instructions of the chain pull painting system 102 cause the computing device (s) 900 to perform the operations described herein. Alternatively, the components of the chain pull painting system 102 can include hardware, such as a special purpose processing device to perform a certain function or group of functions. Additionally, or alternatively, the components of the chain pull painting system 102 can include a combination of computer-executable instructions and hardware.

Furthermore, the components of the chain pull painting system 102 performing the functions described herein with respect to the chain pull painting system 102 may, for example, be implemented as part of a stand-alone application, as a module of an application, as a plug-in for applications, as a library function or functions that may be called by other applications, and/or as a cloud-computing model. Thus, the components of the chain pull painting system 102 may be implemented as part of a stand-alone application on a personal computing device or a mobile device. Alternatively, or additionally, the components of the chain pull painting system 102 may be implemented in any application that provides digital image modification, including, but not limited to ADOBE® PHOTOSHOP®, ADOBE® ILLUSTRATOR®, ADOBE® FRESCO®, and ADOBE® CREATIVE CLOUD®.

The chain pull painting system 102 includes a digital path manager 902 to manage digital drawing paths in digital images. For example, the digital path manager 902 manages digital drawing paths generated via one or more image editing or image generation tools in a digital image application. In some embodiments, the digital path manager 902 extracts digital drawing paths from existing digital images or digital video. The digital path manager 902 also stores digital path points of digital drawing paths in path vectors associated with the digital drawing paths.

The chain pull painting system 102 also includes a bead point manager 904 to manage digital bead points determined from digital drawing paths. For instance, the bead point manager 904 determines digital bead points based on path vectors associated with digital drawing paths. Additionally, the bead point manager 904 stores digital bead points in a path vector (e.g., a new path vector) for a digital beaded chain associated with a digital drawing path.

The chain pull painting system 102 further includes a bead point position manager 906 to manage movement of digital bead points in connection with generating a digital chain pull painting. Specifically, the bead point position manager 906 detects movement of a selected digital bead point to determine movement of other digital bead points. The bead point position manager 906 determines whether movement of one or more digital bead points results in one or more additional digital bead points meeting conditional requirements for movement of the additional digital bead points. The bead point position manager 906 also determines updated positions (e.g., coordinates) for digital bead points.

In one or more embodiments, the chain pull painting system 102 includes a stroke manager 908 to generate strokes in connection with generating a digital chain pull painting. In particular, the stroke manager 908 generates strokes in a digital image based on initial positions and updated positions of digital bead points based on movement of one or more digital bead points in a digital beaded chain. The stroke manager 908 also determines stroke parameters for generating the strokes.

The chain pull painting system 102 also includes a data storage manager 910 (that comprises a non-transitory computer memory/one or more memory devices) that stores and maintains data associated with generating digital chain pull paintings. For example, the data storage manager 910 stores data associated with digital drawing paths including path vectors of digital path points. The data storage manager 910 also stores data associated with digital bead points for digital drawing paths, updated positions based on movement of the digital bead points, and strokes generated in connection with movement of the digital bead points.

Figure 10:
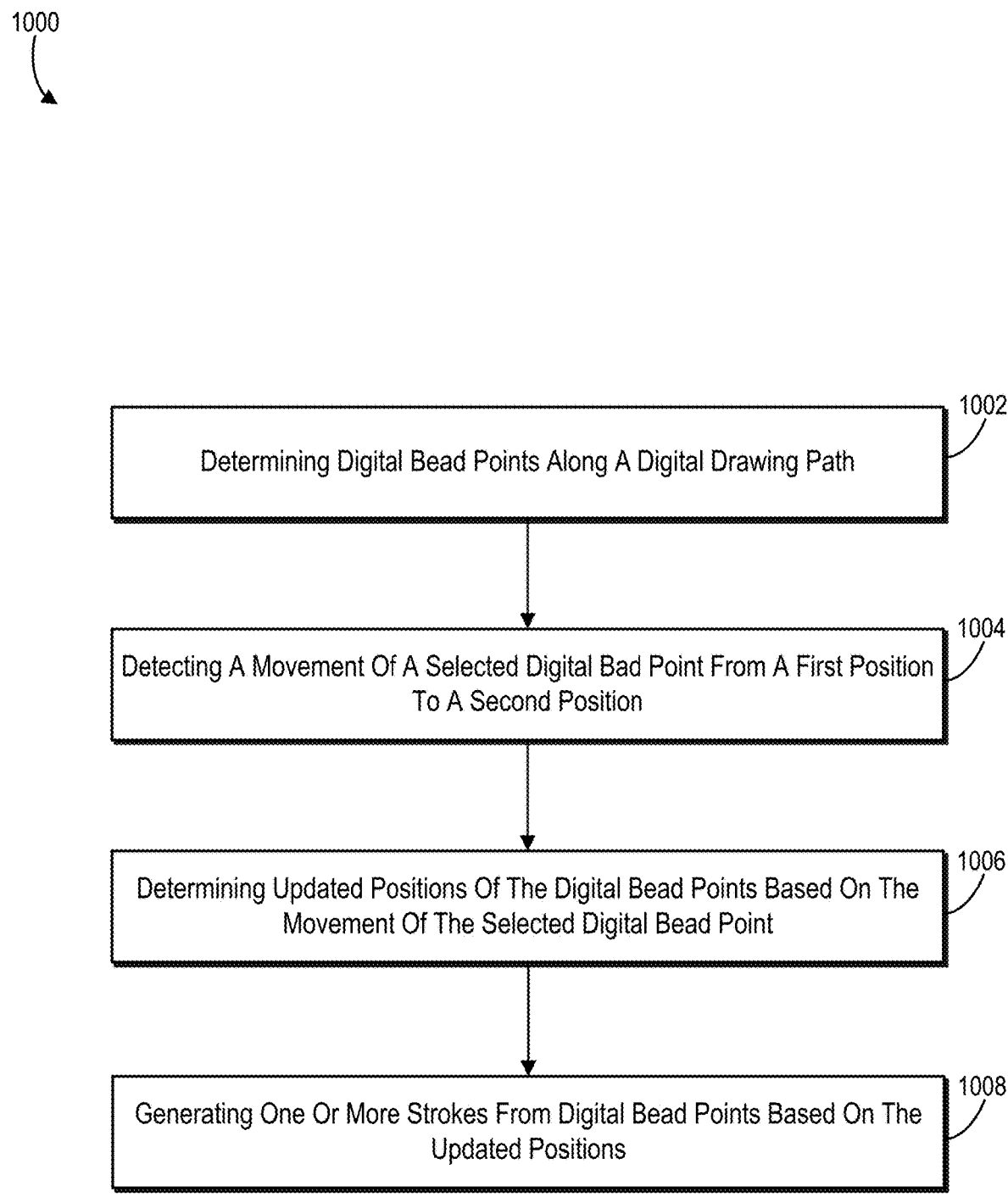
FIG. 10 illustrates a flowchart of a series of acts for generating a digital chain pull painting in a digital image in accordance with one or more implementations.

Turning now to FIG. 10, this figure shows a flowchart of a series of acts 1000 of generating a digital chain pull painting in a digital image. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As shown, the series of acts 1000 includes an act 1002 of determining digital bead points along a digital drawing path. For example, act 1002 involves determining, in response to a request to generate a digital chain pull painting, a plurality of digital bead points along a digital drawing path of a digital image.

Act 1002 can involve determining a plurality of digital path points stored in an initial path vector for the digital drawing path. Act 1002 can also involve generating a new path vector comprising digital bead points representing the plurality of digital path points from the initial path vector. Act 1002 can involve modifying the new path vector by adding or removing one or more digital bead points to store a plurality of equidistant digital bead points along the digital drawing path in the new path vector.

For example, act 1002 can involve generating, from a captured path vector comprising a plurality of digital path points for the digital drawing path, a new path vector comprising digital beads representing the plurality of digital path points in the captured path vector. Act 1002 can then involve adding or removing digital bead points in the new path vector according to a predetermined bead point distance.

Act 1002 can also involve determining that a distance between a selected digital bead point of the new path vector and an adjacent digital bead point of the new path vector is greater than a predetermined bead point distance. Act 1002 can further involve adding, within the new path vector, a new digital bead point between the selected digital bead point and the adjacent digital bead point at the predetermined bead point distance from the selected digital bead point. For example, act 1002 can involve determining that a distance between a first digital bead point of the new path vector and a second digital bead point adjacent to the first digital bead point in the new path vector is greater than the predetermined bead point distance.

Act 1002 can involve determining an additional distance between the new digital bead point between an additional adjacent digital bead point of the new path vector. Act 1002 can also involve adding or removing a digital bead point in the new path vector based on the additional distance.

Act 1002 can involve determining that a distance between a selected digital bead point of the new path vector and an adjacent digital bead point of the new path vector is less than a predetermined bead point distance. Act 1002 can also involve removing the adjacent digital bead point from the new path vector. Act 1002 can involve determining, in response to removing the adjacent digital bead point, that an additional distance between the selected digital bead point and an additional adjacent digital bead point of the new path vector is greater than the predetermined bead point distance. Act 1002 can also involve adding, within the new path vector, an additional digital bead point between the selected digital bead point and the additional adjacent digital bead point at the predetermined bead point distance from the selected digital bead point.

The series of acts 1000 also includes an act 1004 of detecting a movement of a selected digital bead point from a first position to a second position. For example, act 1004 involves detecting a movement of a selected digital bead point of the plurality of digital bead points from a first position to a second position. Act 1004 can involve detecting a first movement of the selected digital bead point from the first position to the second position in response to an input device dragging the selected digital bead point from the first position to the second position. Act 1004 can involve selecting an end point of the digital drawing path. Act 1004 can alternatively involve selecting a midpoint of the digital drawing path.

Additionally, the series of acts 1000 includes an act 1006 of determining updated positions of the digital bead points based on the movement of the selected digital bead point. For example, act 1006 involves determining updated positions of one or more digital bead points based on the movement of the selected digital bead point from the first position to the second position.

For example, act 1006 can involve of a digital bead point of the plurality of digital bead points based on the movement of a selected digital bead point in the digital drawing path from the first position to the second position. Act 1006 can involve determining the updated position in response to determining that a distance between a new position of a previous adjacent digital bead point in the new path vector and the previous position of the digital bead point is greater than a predetermined bead point distance.

Act 1006 can involve determining the updated position in response to determining that a distance between the previous position of the digital bead point and the second position of the selected digital bead point is greater than a distance between the previous position of the selected digital bead point and the first position of the digital bead point. For example, act 1006 can involve determining the updated position based on: the distance between the previous position of the digital bead point and the first position of the selected digital bead point; and a direction from the previous position of the digital bead point and the second position of the selected digital bead point.

Act 1006 can involve determining the updated position based on: the distance between the previous position of the digital bead point and the first position of the selected digital bead point; and an angle corresponding to a direction from the previous position of the digital bead point and the second position of the selected digital bead point.

Act 1006 can involve determining a plurality of updated positions of a digital bead point of the one or more digital bead points. For example, act 1006 can involve determining a first updated position of the digital bead point based on a first movement of the selected digital bead point. Act 1006 can also involve determining a second updated position of the digital bead point based on a second movement of the selected digital bead point.

The series of acts 1000 further includes an act 1008 of generating one or more strokes from digital bead points based on the updated positions. For example, act 1008 involves generating one or more strokes from the one or more digital bead points based on the updated positions of the one or more digital bead points.

For example, act 1008 can involve determining path attributes of the digital drawing path comprising a path color and a path stroke type. Act 1008 can involve assigning the path attributes to a plurality of digital bead points comprising the digital bead point in the digital drawing path. To illustrate, act 1008 can also involve generating the one or more strokes from a previous position of a digital bead point to the updated position of the digital bead point according to the path color and the path stroke type.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
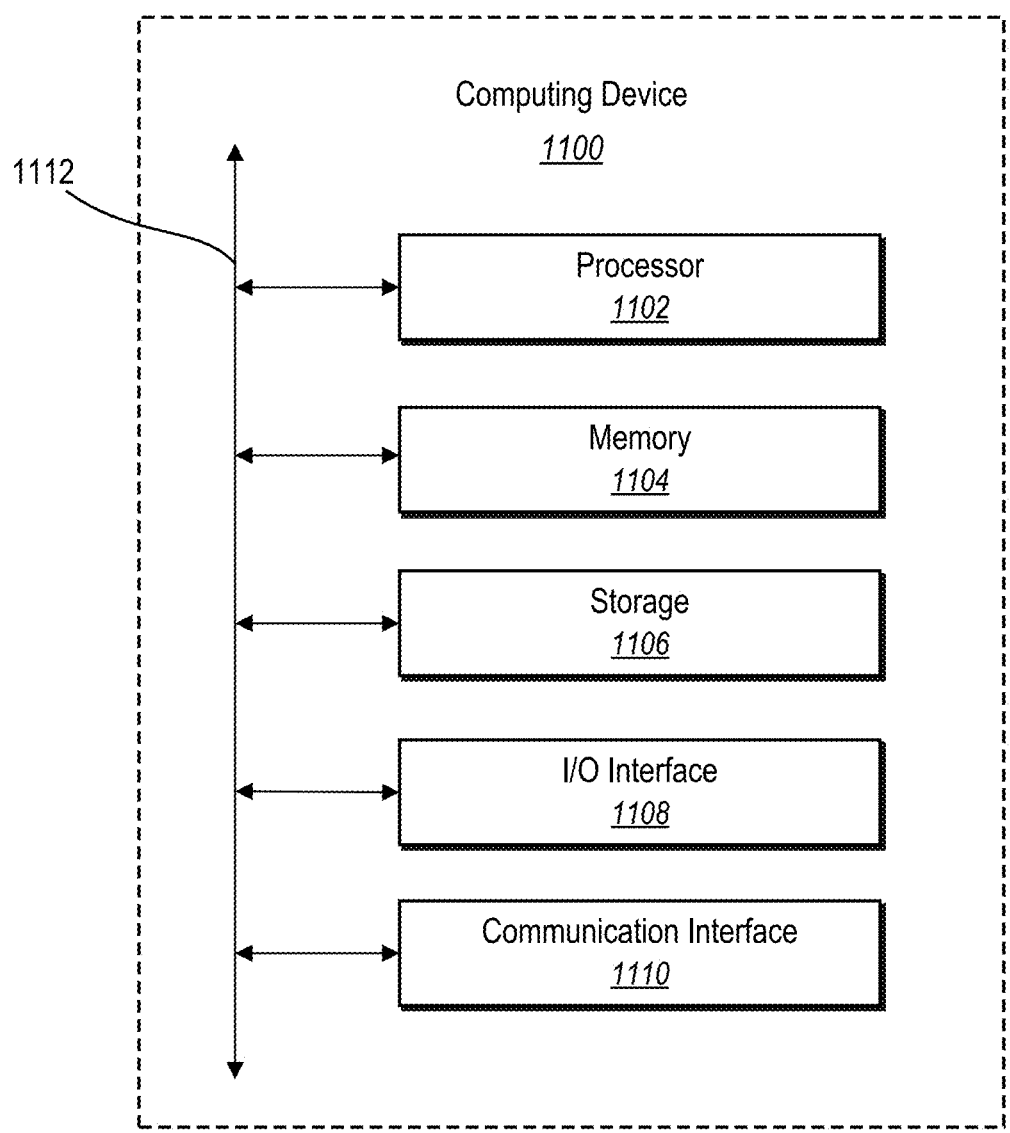
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/0 interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause the at least one processor to perform operations comprising:
  receiving a request to generate a digital chain pull painting on a digital canvas comprising a digital drawing path including a plurality of digital path points;
  converting, in response to the request, the digital drawing path into a digital beaded chain by modifying the plurality of digital path points of the digital drawing path to create a plurality of digital bead points with equal distances between the plurality of digital bead points along the digital drawing path;
  detecting a selected digital bead point of the plurality of digital bead points;
  determining, in response to the selected digital bead point not being at an end of the digital drawing path, a plurality of sets of digital bead points on separate sides of the selected digital bead point that further modify the digital drawing path;
  determining, from the digital beaded chain, a first digital bead point adjacent to the selected digital bead point in the digital beaded chain and a second digital bead point adjacent to the first digital bead point in the digital beaded chain, wherein a first distance between the selected digital bead point and the first digital bead point is equal to a second distance between the first digital bead point and the second digital bead point according to the equal distances between the plurality of digital bead points;
  pulling the digital beaded chain by moving the selected digital bead point from a first position to a second position by moving:
    the first digital bead point from a first initial position to a first updated position to maintain the first distance between the selected digital bead point and the first digital bead point; and
    the second digital bead point from a second initial position to a second updated position to maintain the second distance from the first digital bead point to the second digital bead point; and
  generating, as the selected digital bead point moves from the first position to the second position within the digital canvas, the digital chain pull painting on the digital canvas by:
    drawing, in the digital canvas, a first stroke from the first initial position to the first updated position as the first digital bead point moves from the first initial position to the first updated position; and
    drawing, in the digital canvas, a second stroke from the second initial position to the second updated position as the second digital bead point moves from the second initial position to the second updated position.

2. The non-transitory computer readable medium of claim 1, wherein converting the digital drawing path into the digital beaded chain comprises:
  capturing, in response to the request and a selection of the digital drawing path in connection with the request, an initial path vector for the digital drawing path;
  determining the plurality of digital path points at coordinate positions stored in the initial path vector for the digital drawing path;
  generating, in response to the request, the digital beaded chain as a new path vector along the digital drawing path, the new path vector comprising digital bead points representing the plurality of digital path points from the initial path vector; and
  modifying, in response to the request, the new path vector by adding or removing one or more digital bead points to store the plurality of digital bead points as a plurality of equidistant digital bead points along the digital drawing path in the new path vector.

3. The non-transitory computer readable medium of claim 2, wherein generating the new path vector comprises:
  determining that a distance between an identified digital bead point of the new path vector and an adjacent digital bead point of the new path vector is greater than a predetermined bead point distance corresponding to the equal distances between the plurality of digital bead points; and
  adding, within the new path vector, a new digital bead point between the identified digital bead point and the adjacent digital bead point at the predetermined bead point distance from the identified digital bead point.

4. The non-transitory computer readable medium of claim 3, wherein modifying the new path vector comprises:
  determining an additional distance between the new digital bead point and an additional adjacent digital bead point of the new path vector; and
  adding or removing a digital bead point in the new path vector based on the additional distance.

5. The non-transitory computer readable medium of claim 2, wherein modifying the new path vector comprises:
  determining that a distance between an identified digital bead point of the new path vector and an adjacent digital bead point of the new path vector is less than a predetermined bead point distance corresponding to the equal distances between the plurality of digital bead points; and
  removing the adjacent digital bead point from the new path vector.

6. The non-transitory computer readable medium of claim 5, wherein modifying the new path vector comprises:
  determining, in response to removing the adjacent digital bead point, that an additional distance between the identified digital bead point and an additional adjacent digital bead point of the new path vector is greater than the predetermined bead point distance; and
  adding, within the new path vector, an additional digital bead point between the identified digital bead point and the additional adjacent digital bead point at the predetermined bead point distance from the identified digital bead point.

7. The non-transitory computer readable medium of claim 1, wherein pulling the digital beaded chain comprises:
  determining that the second position of the selected digital bead point results in a new distance between the selected digital bead point at the second position and the first digital bead point at the first initial position, wherein the new distance is greater than the first distance; and
  moving the first digital bead point from the first initial position to the first updated position to maintain the first distance in response to determining that the new distance is greater than the first distance.

8. The non-transitory computer readable medium of claim 1, wherein moving the first digital bead point comprises determining the first updated position based on a Euclidean distance between the first updated position and the second position of the selected digital bead point matching the first distance.

9. The non-transitory computer readable medium of claim 8, wherein determining the first updated position comprises determining the first updated position by moving the first digital bead point from the first initial position in a direction of the second position of the selected digital bead point.

10. The non-transitory computer readable medium of claim 1, wherein drawing the first stroke comprises:
determining path attributes of the digital drawing path comprising a path color and a path stroke type;
assigning the path attributes to the plurality of digital bead points comprising the first digital bead point in the digital beaded chain; and
animating the digital chain pull painting as the selected digital bead point moves within the digital canvas by generating the first stroke from the first initial position of the first digital bead point to the first updated position of the first digital bead point according to the path color and the path stroke type.

11. A system, comprising:
one or more computer memory devices; and
one or more processing devices configured to cause the system to:
receive a request to generate a digital chain pull painting on a digital canvas comprising a digital drawing path including a plurality of digital path points;
convert, in response to the request, the digital drawing path into a digital beaded chain by modifying the plurality of digital path points of the digital drawing path to create a plurality of digital bead points with equal distances between the plurality of digital bead points along the digital drawing path;
detect a selected digital bead point of the plurality of digital bead points;
determine, in response to the selected digital bead point not being at an end of the digital drawing path, a plurality of sets of digital bead points on separate sides of the selected digital bead point that further modify the digital drawing path;
determine a first digital bead point adjacent to the selected digital bead point in the digital beaded chain and a second digital bead point adjacent to the first digital bead point in the digital beaded chain, wherein a first distance between the selected digital bead point and the first digital bead point is equal to a second distance between the first digital bead point and the second digital bead point according to the equal distances between the plurality of digital bead points;
pull the digital beaded chain by moving the selected digital bead point from a first position to a second position by moving:
the first digital bead point from a first initial position to a first updated position to maintain the first distance between the selected digital bead point and the first digital bead point; and
the second digital bead point from a second initial position to a second updated position to maintain the second distance from the first digital bead point to the second digital bead point; and
generate, as the selected digital bead point moves from the first position to the second position within the digital canvas, the digital chain pull painting on the digital canvas by:
drawing, in the digital canvas, a first stroke from the first initial position to the first updated position as the first digital bead point moves from the first initial position to the first updated position; and
drawing, in the digital canvas, a second stroke from the second initial position to the second updated position as the second digital bead point moves from the second initial position to the second updated position.

12. The system of claim 11, wherein the one or more processing devices are further configured to determine the plurality of digital bead points by:
generating, in response to the request to generate the digital chain pull painting and from a captured path vector comprising the plurality of digital path points for the digital drawing path, the digital beaded chain as a new path vector comprising digital bead points representing the plurality of digital path points in the captured path vector; and
adding or removing digital bead points in the new path vector according to a predetermined bead point distance corresponding to the equal distances between the plurality of digital bead points.

13. The system of claim 12, wherein the one or more processing devices are further configured to generate the new path vector by:
determining that a distance between a first point of the new path vector and a second point adjacent to the first point in the new path vector is greater than the predetermined bead point distance; and
adding, within the new path vector, a new point between the first point and the second point at the predetermined bead point distance from the first point.

14. The system of claim 12, wherein the one or more processing devices are further configured to generate the new path vector by:
determining that a distance between a first point of the new path vector and a second point adjacent to the first point in the new path vector is less than the predetermined bead point distance; and
replacing, within the new path vector, the second point with a new point at the predetermined bead point distance from the first point.

15. The system of claim 11, wherein the one or more processing devices are further configured to determine the first updated position of the first digital bead point in response to:
determining that a distance between the second position of the selected digital bead point and the first initial position of the first digital bead point is greater than the first distance.

16. The system of claim 15, wherein the one or more processing devices are further configured to determine the first updated position of the first digital bead point by determining the first updated position based on:
the distance between the first initial position of the first digital bead point and the first position of the selected digital bead point; and
an angle corresponding to a direction from the first initial position of the first digital bead point and the second position of the selected digital bead point.

17. The system of claim 11, wherein the one or more processing devices are further configured to determine a plurality of updated positions of the first digital bead point by:
- determining the first updated position of the first digital bead point based on a first movement of the selected digital bead point; and
- determining an additional updated position of the first digital bead point based on a second movement of the selected digital bead point.

18. A computer-implemented method, comprising:
- receiving, by at least one processor, a request to generate a digital chain pull painting on a digital canvas comprising a digital drawing path including a plurality of digital path points;
- converting, by the at least one processor in response to the request, the digital drawing path into a digital beaded chain by modifying the plurality of digital path points of the digital drawing path to create a plurality of digital bead points with equal distances between the plurality of digital bead points along the digital drawing path;
- detecting, by the at least one processor, a selected digital bead point of the plurality of digital bead points;
- determine, in response to the selected digital bead point not being at an end of the digital drawing path, a plurality of sets of digital bead points on separate sides of the selected digital bead point that further modify the digital drawing path;
- determining, by the at least one processor, a first digital bead point adjacent to the selected digital bead point in the digital beaded chain and a second digital bead point adjacent to the first digital bead point in the digital beaded chain, wherein a first distance between the selected digital bead point and the first digital bead point is equal to a second distance between the first digital bead point and the second digital bead point according to the equal distances between the plurality of digital bead points;
- pulling, by the at least one processor, the digital beaded chain by moving the selected digital bead point from a first position to a second position by moving:
  - the first digital bead point from a first initial position to a first updated position to maintain the first distance between the selected digital bead point and the first digital bead point; and
  - the second digital bead point from a second initial position to a second updated position to maintain the second distance from the first digital bead point to the second digital bead point; and
- generating, by the at least one processor, as the selected digital bead point moves from the first position to the second position within the digital canvas, the digital chain pull painting on the digital canvas by:
  - drawing, in the digital canvas, a first stroke from the first initial position of the first digital bead point to the first updated position as the first digital bead point moves from the first initial position to the first updated position; and
  - drawing, in the digital canvas, a second stroke from the second initial position to the second updated position as the second digital bead point moves from the second initial position to the second updated position.

19. The computer-implemented method of claim 18, wherein converting the digital drawing path into the digital beaded chain comprises generating the plurality of digital bead points along a vector corresponding to the digital drawing path with the equal distances between the plurality of digital bead points corresponding to a predetermined bead point distance between each pair of digital bead points of the plurality of digital bead points.

20. The computer-implemented method of claim 18, further comprising drawing, as the selected digital bead point moves from the second position to a third position within the digital canvas, an additional first stroke from the first updated position of the first digital bead point to an additional updated position that maintains the first distance between the selected digital bead point and the first digital bead point.

* * * * *